(12) United States Patent
Hirano et al.

(10) Patent No.: US 7,545,770 B2
(45) Date of Patent: Jun. 9, 2009

(54) RADIO COMMUNICATION SYSTEM AND RADIO COMMUNICATION METHOD

(75) Inventors: Jun Hirano, Yokosuka (JP); Daichi Imamura, Yokosuka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/927,338

(22) Filed: Oct. 29, 2007

(65) Prior Publication Data

US 2008/0051052 A1 Feb. 28, 2008

Related U.S. Application Data

(62) Division of application No. 10/534,274, filed on Oct. 26, 2005, now abandoned.

(51) Int. Cl.
*H04Q 7/00* (2006.01)
*H04J 3/06* (2006.01)

(52) U.S. Cl. .................. 370/328; 370/203; 370/210; 370/503

(58) Field of Classification Search .......... 370/328, 370/203, 207–208, 210, 252, 500, 503, 506, 370/509–514, 520; 455/68, 266
See application file for complete search history.

(56) References Cited

U.S. PATENT DOCUMENTS

| | | | |
|---|---|---|---|
| 6,347,220 B1 | 2/2002 | Tanaka et al. | |
| 7,020,445 B1 * | 3/2006 | Miya | 455/101 |
| 7,027,464 B1 * | 4/2006 | Nakahara et al. | 370/503 |
| 7,177,266 B2 * | 2/2007 | Sudo | 370/208 |
| 2001/0036308 A1 | 11/2001 | Katayama et al. | |
| 2003/0211851 A1 * | 11/2003 | Moon et al. | 455/450 |

FOREIGN PATENT DOCUMENTS

| | | |
|---|---|---|
| JP | 10313274 | 11/1998 |
| JP | 11150764 | 6/1999 |

(Continued)

OTHER PUBLICATIONS

PCT International Search Report dated Jan. 27, 2004.

(Continued)

*Primary Examiner*—Pablo N Tran
(74) *Attorney, Agent, or Firm*—Dickinson Wright, PLLC

(57) ABSTRACT

This object is to conclude an agreement for making an insertion interval of a pilot signal variable between radio communication apparatuses and improve a throughput of a communication. A pilot signal insertion interval acquiring unit 3 acquires the insertion interval of the pilot signal (known reference signal) which is optimal in a propagation path to a predetermined radio communication apparatus, from a signal sent through an antenna 9 and a receiving RF unit 1, or information sent from a higher layer. Then, in accordance with the insertion interval of this pilot signal, the pilot signal is inserted into a transmission data, and it is transmitted, or the insertion interval of the pilot signal is reported as the transmission data to a different radio communication apparatus. Thus, the insertion interval of the pilot signal in the propagation path can be made optimal. By the way, from a temporal variation quantity of a propagation response, the insertion interval of the pilot signal that becomes optimal is calculated, thereby enabling the acquisition of the insertion interval of the pilot signal that is more proper.

3 Claims, 12 Drawing Sheets

FOREIGN PATENT DOCUMENTS

| | | |
|---|---|---|
| JP | 11266228 | 9/1999 |
| JP | 11284597 | 10/1999 |
| JP | 2000224247 | 8/2000 |
| JP | 2001339363 | 12/2001 |
| JP | 2002199227 | 7/2002 |
| JP | 2003332943 | 11/2003 |
| JP | 2004048115 | 2/2004 |

OTHER PUBLICATIONS

IEEE standard 802.11 "Wireless Medium Access Control (MAC) and Physical (PHY) Specifications." IEEE, Inc., New York 1997.

IEEE Std 802.11e/D4.2, Feb. 2003 (Draft Supplement to IEEE Std 802.11, 1999 Edition).

* cited by examiner

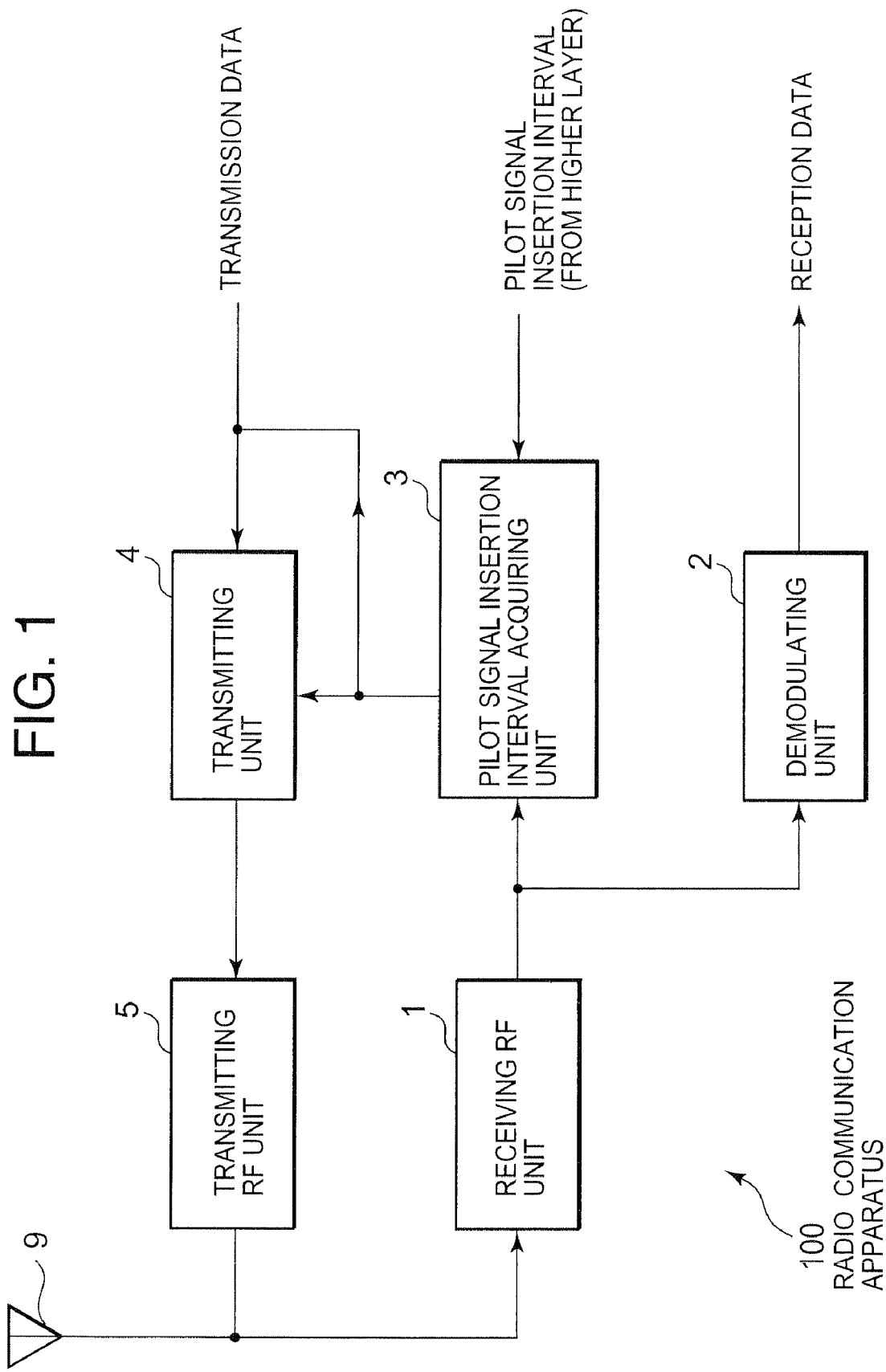

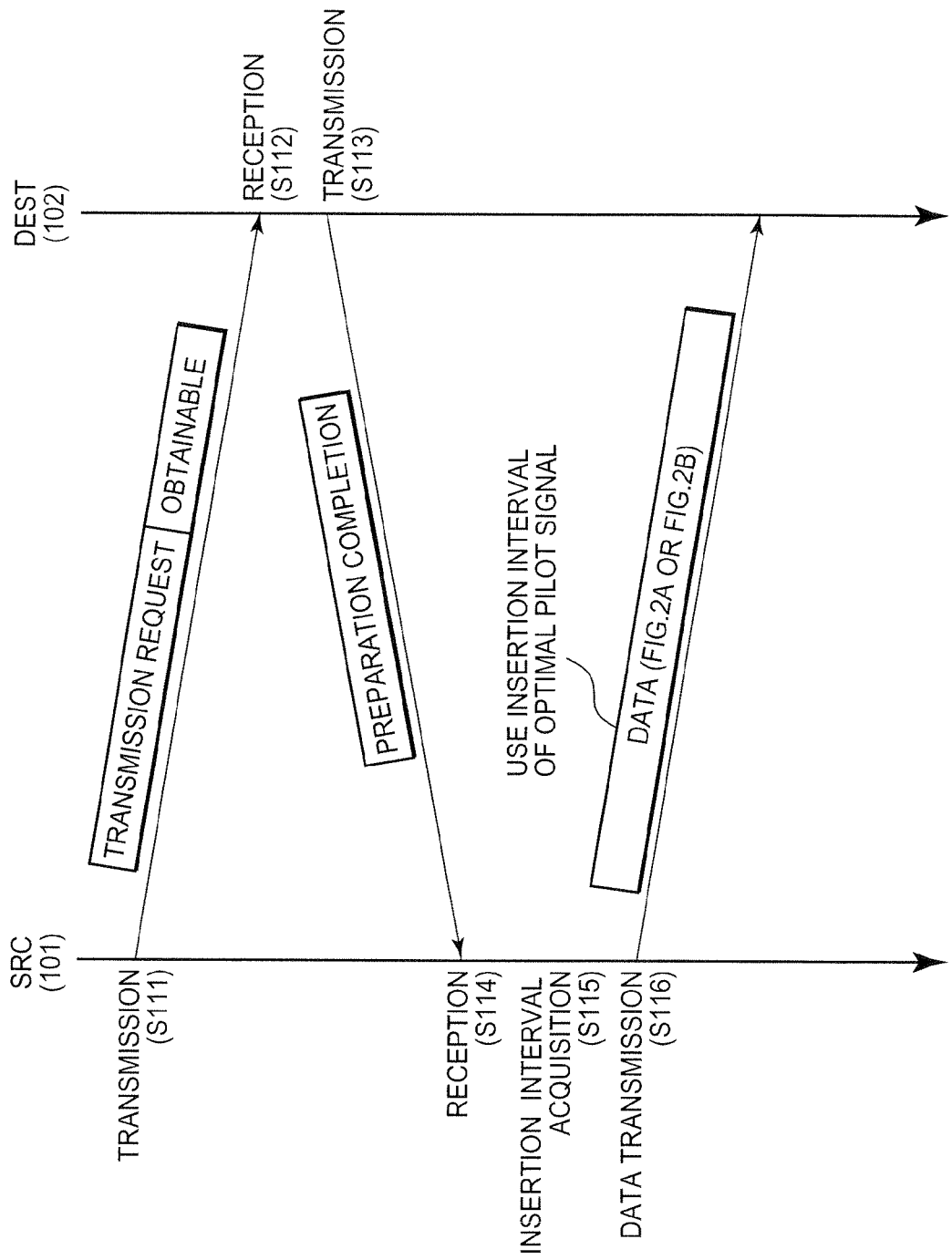

RADIO COMMUNICATION SYSTEM AND RADIO COMMUNICATION METHOD

This is a divisional application of application Ser. No. 10/534,274 filed May 9, 2005, which is based on and claims priority of JP2002-327118, the entire contents of which are incorporated by reference in their entirety.

TECHNICAL FIELD

The present invention relates to a radio communication system and a radio communication method, and more particularly relates to a radio communication system and a radio communication method that can improve a throughput of a communication.

BACKGROUND ART

Conventionally, there are various rules with regard to a radio communication carried out between radio communication apparatuses. For example, an IEEE standard 802.11 rule (refer to the following non-patent document 1) that is a standard rule in a radio LAN (Local Area Network) and the like are listed.

In the rule defined by the non-patent document 1 and many communication rules, at the stage prior to the communication, a transmitting part transmits a transmission request information for requesting the transmission of a data to a receiving part, and the receiving part transmits a reception preparation completion information, which is the response of the transmission request information, to the transmitting part, and the data propagation is consequently started. Also, after the data propagation, the receiving part can acknowledge the data reception by transmitting a reception acknowledgement (which may be abbreviated as Ack) information.

Also, in a digital mobile radio communication system such as a radio LAN, a land mobile communication and the like, in order to improve a propagation speed, a multi-level orthogonal amplitude modulation method that requires a synchronous detection such as 16 QAM (Quadrature Amplitude Modulation), 64 QAM and the like is applied. In the digital mobile radio communication that involves the movement of a transmitting/receiving station and the movement of a peripheral environment, the fading in which the amplitude and phase of a reception signal are varied causes the property to be largely deteriorated. Thus, in order to apply the QAM to the mobile radio communication, an effectively compensating method for the amplitude and phase variation in the reception signal caused by the fading is required.

For this reason, the mobile radio communication employs a method, in which the transmitting part periodically inserts a known reference signal (a pilot symbol, also referred to as a pilot signal) between information symbols, and the receiving part carries out the amplitude and phase variation compensation, with the pilot symbol received from the transmitting part as a standard, in a complex base band. The technique for making the insertion interval of this pilot signal variable and carrying out the communication in the insertion interval of the pilot signal suitable for each propagation path is disclosed, for example, in the following patent document 1.

Also, this applicant files a technique that reduces a propagation time of a header added to a data and an empty time and consequently improves a data propagation efficiency, in Japanese Patent Application (JP-A 2002-199227) (since this is unpublished, this is not known, and this does not configure the conventional technique). According to this technique, for example, it is possible to continuously transmit the data, remove a non-signal block between the data (between frames), carry out the reduction in the header and the substitution into the data whose capacity is small, and reduce the header capacity, and consequently improve the throughput of the communication.

Non-Patent Document 1: IEEE standard 802.11, "Wireless LAN Medium Access Control (MAC) and Physical Layer (PHY) Specifications, "IEEE, Inc., New York 1997

Patent Document 1: Japanese Laid Open Patent Application (JP-A 2001-339363 (Claim 6, Paragraph 0063, 0064)

However, typically, the insertion interval of the pilot signal is fixedly defined and always constant independently of the transmission path environment between the transmitting part and the receiving part. Thus, if the insertion interval of the pilot signal is made variable, an agreement with regard to the insertion interval of this pilot signal needs to be concluded between the radio communication apparatuses where the communication is executed. However, the radio communication system in which the foregoing agreement can be actually concluded does not exist. Also, for example, in the communication rule such as the radio communication rule noted in the non-patent document 1, the communication rule in which together with the respective information of the transmission request information, the reception preparation completion information, the reception Ack information and the like, the different information can be transmitted does not exist at present.

DISCLOSURE OF THE INVENTION

In view of the above-mentioned problems, it is therefore an object of the present invention to provide a radio communication system and a radio communication apparatus that can conclude an agreement for making an insertion interval of a pilot signal variable, between radio communication apparatuses, and improve a throughput of a communication.

In order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the transmitting part radio communication apparatus has known reference signal insertion interval determining means that can determine the insertion interval of the known reference signal, and the transmitting part radio communication apparatus inserts the known reference signal into the data, in accordance with the insertion interval of the known reference signal determined by the known reference signal insertion interval determining means.

With this configuration, the transmitting part radio communication apparatus can determine the insertion interval of the known reference signal inserted when the data is transmitted to the receiving part radio communication apparatus from the transmitting part radio communication apparatus. Since the communication based on the insertion interval of this known reference signal is carried out, the throughput of the communication can be improved.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the transmitting part radio communication apparatus has: known reference signal insertion interval determining means that can determine the insertion interval of the known reference signal; and reporting means for reporting a fact that the insertion interval of the known reference signal can be determined, together with a transmission request information of the data, to the receiving part radio communication apparatus prior to transmitting the data, and the transmitting part radio communication apparatus, when receiving a reception preparation completion information that is a response to the transmission request information from the receiving part radio communication apparatus, determines the insertion interval of the known reference signal and transmits the data, into which the known reference signal is inserted in accordance with the insertion interval of the determined known reference signal, to the receiving part radio communication apparatus.

With this configuration, the transmitting part radio communication apparatus can determine the insertion interval of the known reference signal inserted into the data, at the reception timing of the reception preparation completion information immediately before the transmitting part radio communication apparatus transmits the data to the receiving part radio communication apparatus. Since the communication based on the insertion interval of this known reference signal is carried out, the throughput of the communication can be improved.

Moreover, the radio communication system according to the present invention is configured such that, in the foregoing invention, the transmitting part radio communication apparatus refers to an information signal related to the reception preparation completion information received from the receiving part radio communication apparatus, and determines the insertion interval of the known reference signal which is optimal in the data transmission.

With this configuration, the transmitting part radio communication apparatus can refer to the information signal related to the reception preparation completion information immediately before the transmitting part radio communication apparatus transmits the data to the receiving part radio communication apparatus.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the transmitting part radio communication apparatus has: known reference signal insertion interval determining means that can determine the insertion interval of the known reference signal, and when the transmitting part radio communication apparatus transmits a data different from the data to the receiving part radio communication apparatus prior to transmitting the data and receives a reception Ack information indicating that the reception of the different data from the receiving part radio communication apparatus has been completed, the transmitting part radio communication apparatus determines the insertion interval of the known reference signal and transmits the data, into which the known reference signal is inserted in accordance with the insertion interval of the determined known reference signal, to the receiving part radio communication apparatus.

With this configuration, the transmitting part radio communication apparatus can determine the insertion interval of the known reference signal inserted into the data, at the reception timing of the reception Ack information immediately before the transmitting part radio communication apparatus transmits the data to the receiving part radio communication apparatus. Since the communication based on the insertion interval of this known reference signal is carried out, the throughput of the communication can be improved.

Moreover, the radio communication system according to the present invention is configured such that, in the foregoing invention, the transmitting part radio communication apparatus refers to an information signal related to the reception Ack information received from the receiving part radio communication apparatus, and determines the insertion interval of the known reference signal which is optimal in the data transmission.

With this configuration, the transmitting part radio communication apparatus can refer to the information signal related to the reception Ack information immediately before the transmitting part radio communication apparatus transmits the data to the receiving part radio communication apparatus.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the transmitting part radio communication apparatus has: known reference signal insertion interval determining means that can determine the insertion interval of the known reference signal, and the transmitting part radio communication apparatus receives an information signal transmitted to any radio communication apparatus from the receiving part radio communication apparatus, refers to the received information signal and determines the insertion interval of the known reference signal which is optimal in transmitting the data to the receiving part radio communication apparatus.

With this configuration, the transmitting part radio communication apparatus refers to the information signal received before the transmitting part radio communication apparatus transmits the data to the receiving part radio communication apparatus, and can determine the insertion interval of the known reference signal inserted into the data. Since the communication based on the insertion interval of this known reference signal is carried out, the throughput of the communication can be improved.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the receiving part radio communication apparatus has: known reference signal insertion interval determining means that can determine the insertion interval of the known reference signal; and reporting means for reporting the insertion interval of the known reference signal determined by the known reference signal insertion interval determining means, prior to transmitting the data, to the transmitting part radio communication apparatus.

With this configuration, the receiving part radio communication apparatus can determine the insertion interval of the known reference signal inserted when the transmitting part radio communication apparatus transmits the data to the receiving part radio communication apparatus. Since the communication based on the insertion interval of this known reference signal is carried out, the throughput of the communication can be improved.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the transmitting part radio communication apparatus has transmitting means for transmitting an information for requesting the insertion interval of the known reference signal together with a transmission request information of the data, to the receiving part radio communication apparatus prior to transmitting the data, the receiving part radio communication apparatus has: known reference signal insertion interval determining means that can determine the insertion interval of the known reference signal; and reporting means for reporting the insertion interval of the known reference signal determined by the known reference signal insertion interval determining means to the transmitting part radio communication apparatus, prior to transmitting the data, and the transmitting part radio communication apparatus transmits the information for requesting the insertion interval of the known reference signal together with the transmission request information of the data, to the receiving part radio communication apparatus prior to transmitting the data, and the receiving part radio communication apparatus determines the insertion interval of the known reference signal and reports the insertion interval of the determined known reference signal to the transmitting part radio communication apparatus, and the transmitting part radio communication apparatus inserts the known reference signal into the data, in accordance with the insertion interval of the known reference signal reported from the receiving part radio communication apparatus, and transmits to the receiving part radio communication apparatus.

With this configuration, the transmitting part radio communication apparatus, for example, if the insertion interval of the optimal known reference signal cannot be determined, performs the request of the determination on the receiving part radio communication apparatus. The receiving part radio communication apparatus can determine and report the insertion interval of the known reference signal inserted into the data, at the reception timing of the information for requesting the insertion interval of the known reference signal and the transmission request information of the data. Since the communication based on the insertion interval of this known reference signal is carried out, the throughput of the communication can be improved.

Moreover, the radio communication system of the present invention is configured such that in the foregoing invention, the receiving part radio communication apparatus refers to the information signal related to the information for requesting the insertion interval of the known reference signal and the transmission request information of the data received from the transmitting part radio communication apparatus, and determines the insertion interval of the known reference signal which is optimal in the data transmission.

With this configuration, the receiving part radio communication apparatus refers to the information signal related to the information for requesting the insertion interval of the known reference signal and the transmission request information of the data immediately before the transmitting part radio communication apparatus transmits the data to the receiving part radio communication apparatus, and can determine the insertion interval of the known reference signal inserted into the data.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the receiving part radio communication apparatus has: known reference signal insertion interval determining means that can determine the insertion interval of the known reference signal, and when the transmitting part radio communication apparatus transmits a data different from the data to the receiving part radio communication apparatus prior to transmitting the data, the receiving part radio communication apparatus determines the insertion interval of the known reference signal and reports the insertion interval of the determined known reference signal to the transmitting part radio communication apparatus, and the transmitting part radio communication apparatus inserts the known reference signal into the data, in accordance with the insertion interval of the known reference signal reported from the receiving part radio communication apparatus and transmits to the receiving part radio communication apparatus.

With this configuration, the transmitting part radio communication apparatus, for example, if the insertion interval of the optimal known reference signal cannot be determined, performs the request of the determination on the receiving part radio communication apparatus. The receiving part radio communication apparatus can determine the insertion interval of the known reference signal inserted into the data, at the reception timing of any data, and report this insertion interval together with the reception Ack information. Since the communication based on the insertion interval of this known reference signal is carried out, the throughput of the communication can be improved.

Moreover, the radio communication system of the present invention is configured such that in the foregoing invention, the receiving part radio communication apparatus refers to an information signal related to the different data received from the transmitting part radio communication apparatus, and determines the insertion interval of the known reference signal which is optimal in transmitting the data to the receiving part radio communication apparatus.

With this configuration, the transmitting part radio communication apparatus refers to the information signal related to the reception Ack information immediately before the transmitting part radio communication apparatus transmits the data to the receiving part radio communication apparatus, and can determine and report the insertion interval of the known reference signal inserted into the data.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, wherein the receiving part radio communication apparatus has: known reference signal insertion interval determining means that can determine the insertion interval of the known reference signal, and the receiving part radio communication apparatus receives an information signal transmitted to any radio communication apparatus from the transmitting part radio communication apparatus, and refers to the received information signal and determines the insertion interval of the known reference signal, and reports the insertion interval of the determined known reference signal to the transmitting part radio communication apparatus, and the transmitting part radio communication apparatus inserts the known reference signal into the data, in accordance with the insertion interval of the known reference signal reported from the receiving part radio communication apparatus, and transmits to the receiving part radio communication apparatus.

With this configuration, the receiving part radio communication apparatus refers to the information signal received before the transmitting part radio communication apparatus transmits the data to the receiving part radio communication apparatus, and can determine and report the insertion interval of the known reference signal inserted into the data. Since the communication based on the insertion interval of this known reference signal is carried out, the throughput of the communication can be improved.

Also, in order to attain the foregoing object, a radio communication system of the present invention is a radio communication system that is provided with a transmitting part radio communication apparatus and a receiving part radio communication apparatus, in which an insertion interval of a known reference signal inserted into a data that is propagated in a communication between the transmitting part radio communication apparatus and the receiving part radio communication apparatus is variable, wherein the transmitting part radio communication apparatus and the receiving part radio communication apparatus have known reference signal insertion interval acquiring means that can acquire the insertion interval of the known reference signal, and the insertion interval of the known reference signal acquired by the transmitting part radio communication apparatus and the insertion interval of the known reference signal acquired by the receiving part radio communication apparatus are used to determine the insertion interval of the known reference signal inserted into the data.

With this configuration, both of the transmitting part radio communication apparatus and the receiving part radio communication apparatus can determine the insertion interval of the known reference signal. For example, any one of the two known reference signals or the average of the two known reference signals or the like can be calculated and selected, thereby determining the insertion interval of the known reference signal at the better precision.

Also, in order to attain the foregoing object, a radio communication system of the present invention is a radio communication system that is provided with: a plurality of radio communication apparatuses; and a communication managing apparatus communicable with the plurality of radio communication apparatuses, in which an insertion interval of a known reference signal inserted into a data that is propagated in a communication between each of the plurality of radio communication apparatuses and the communication managing apparatus is variable, wherein the communication managing apparatus has: known reference signal insertion interval determining means that can determine the insertion interval of the known reference signal which is optimal in the communication with each of the plurality of radio communication apparatuses; and storing means that can store the insertion interval of the known reference signal which is optimal in a propagation path to each of the plurality of radio communication apparatuses.

With this configuration, the communication managing apparatus can calculate the insertion interval of the known reference signal which is optimal for the communication with each of the plurality of radio communication apparatuses, and the communication managing apparatus can intensely manage and store.

Also, in order to attain the foregoing object, a radio communication system of the present invention is a radio communication system that is provided with: a plurality of radio communication apparatuses; and a communication managing apparatus communicable with the plurality of radio communication apparatuses, in which an insertion interval of a known reference signal inserted into a data that is propagated in a communication between each of the plurality of radio communication apparatuses and the communication managing apparatus is variable, wherein each of the plurality of radio communication apparatuses has: known reference signal insertion interval determining means that can determine the insertion interval of the known reference signal which is optimal in the communication with the communication managing apparatus; and storing means that can store the insertion interval of the known reference signal which is optimal in a propagation path to the communication managing apparatus.

With this configuration, each of the plurality of radio communication apparatuses can calculate the insertion interval of the known reference signal that is optimal for the communication with the communication managing apparatus, which can be managed and stored by each radio communication apparatus.

Moreover, the radio communication system of the present invention is configured such that in the foregoing invention, each of the plurality of radio communication apparatuses refers to a report signal which is reported to any of the radio communication apparatuses by the communication managing apparatus; and determines the insertion interval of the known reference signal which becomes optimal in the propagation path to the communication managing apparatus.

With this configuration, for example, the report signal, such as a beacon or the like, which is periodically reported from the communication managing apparatus can be used to determine the insertion interval of the known reference signal.

Moreover, the radio communication system of the present invention is configured such that in the foregoing invention, the known reference signal insertion interval determining means refers to a temporal variation quantity of a propagation path response, and calculates the insertion interval of the known reference signal which becomes optimal in transmitting the data.

With this configuration, by referring to the temporal variation quantity of the propagation path response, it is possible to calculate the insertion interval of the optimal known reference signal, and possible to determine the insertion interval of the pilot signal which becomes optimal in the data transmission.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the transmitting part radio communication apparatus determines the insertion interval of the known reference signal; and a step where the transmitting part radio communication apparatus inserts the known reference signal into the data, in accordance with the insertion interval of the determined known reference signal, and transmits to the receiving part radio communication apparatus.

Consequently, the transmitting part radio communication apparatus can determine the insertion interval of the known reference signal inserted when the transmitting part radio communication apparatus transmits the data to the receiving part radio communication apparatus. Since the communication based on the insertion interval of this known reference signal is carried out, the throughput of the communication can be improved.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the transmitting part radio communication apparatus reports a fact that the insertion interval of the known reference signal together with a transmission request information of the data can be determined, to the receiving part radio communication apparatus prior to transmitting the data; a step where the receiving part radio communication apparatus receives the transmission request information and transmits a reception preparation completion information that is a response to the transmission request information; a step where the transmitting part radio communication apparatus, when receiving the reception preparation completion information from the receiving part radio communication apparatus, determines the insertion interval of the known reference signal; and a step where the transmitting part radio communication apparatus transmits the data, into which the known reference signal is inserted in accordance with the insertion interval of the determined known reference signal, to the receiving part radio communication apparatus.

Consequently, the transmitting part radio communication apparatus can determine the insertion interval of the known reference signal inserted into the data, at the reception timing of the reception preparation completion information immediately before the transmitting part radio communication apparatus transmits the data to the receiving part radio communication apparatus. Since the communication based on the insertion interval of this known reference signal is carried out, the throughput of the communication can be improved.

Moreover, the radio communication method of the present invention has a step in the foregoing invention, where the transmitting part radio communication apparatus refers to an information signal related to the reception preparation completion information received from the receiving part radio communication apparatus, and determines the insertion interval of the known reference signal which is optimal in the data transmission.

Consequently, the transmitting part radio communication apparatus refers to the information signal related to the reception preparation completion information immediately before the transmitting part radio communication apparatus transmits the data to the receiving part radio communication apparatus.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the transmitting part radio communication apparatus transmits a data different from the data, to the receiving part radio communication apparatus prior to transmitting the data; a step where the receiving part radio communication apparatus receives the different data and transmits a reception Ack information indicating that the reception of the different data has been completed; a step where when the transmitting part radio communication apparatus receives the reception Ack information from the receiving part radio communication apparatus, the transmitting part radio communication apparatus determines the insertion interval of the known reference signal; and a step where the transmitting part radio communication apparatus transmits the data, into which the known reference signal is inserted in accordance with the insertion interval of the determined known reference signal, to the receiving part radio communication apparatus.

Consequently, the transmitting part radio communication apparatus can determine the insertion interval of the known reference signal inserted into the data, at the reception timing of the reception Ack information received immediately before the transmitting part radio communication apparatus transmits the data to the receiving part radio communication apparatus. Since the communication based on the insertion interval of this known reference signal is carried out, the throughput of the communication can be improved.

Moreover, the radio communication method of the present invention has a step in the foregoing invention, where the transmitting part radio communication apparatus refers to an information signal related to the reception Ack information received from the receiving part radio communication apparatus, and determines the insertion interval of the known reference signal which is optimal in transmitting the data to the receiving part radio communication apparatus.

Consequently, the transmitting part radio communication apparatus refers to the information signal related to the reception Ack information immediately before the transmitting part radio communication apparatus transmits the data to the receiving part radio communication apparatus, and can determine the insertion interval of the known reference signal inserted into the data.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the transmitting part radio communication apparatus receives an information signal transmitted to any radio communication apparatus from the receiving part radio communication apparatus; and a step where the transmitting part radio communication apparatus refers to the received information signal and determines the insertion interval of the known reference signal which is optimal in transmitting the data to the receiving part radio communication apparatus.

Consequently, the transmitting part radio communication apparatus refers to the information signal received before the transmitting part radio communication apparatus transmits the data to the receiving part radio communication apparatus, and can determine the insertion interval of the known reference signal inserted into the data. Since the communication based on the insertion interval of this known reference signal is carried out, the throughput of the communication can be improved.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including a step where the receiving part radio communication apparatus determines the insertion interval of the known reference signal; and a step where the receiving part radio communication apparatus reports the insertion interval of the determined known reference signal, to the transmitting part radio communication apparatus, prior to transmitting the data.

Consequently, the receiving part radio communication apparatus can determine the insertion interval of the known reference signal inserted when the transmitting part radio communication apparatus transmits the data to the receiving part radio communication apparatus. Since the communication based on the insertion interval of this known reference signal is carried out, the throughput of the communication can be improved.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the transmitting part radio communication apparatus transmits an information for requesting the insertion interval of the known reference signal together with a transmission request information of the data, to the receiving part radio communication apparatus prior to transmitting the data; a step where the receiving part radio communication apparatus receives the information for requesting the insertion interval of the known reference signal and determines the insertion interval of the known reference signal; a step where the receiving part radio communication apparatus reports the insertion interval of the determined known reference signal to the transmitting part radio communication apparatus; and a step where the transmitting part radio communication apparatus inserts the known reference signal into the data, in accordance with the insertion interval of the known reference signal reported from the receiving part radio communication apparatus, and transmits to the receiving part radio communication apparatus.

Consequently, the transmitting part radio communication apparatus performs the request of the determination on the receiving part radio communication apparatus, for example, if the insertion interval of the optimal known reference signal cannot be determined, and the receiving part radio communication apparatus can determine and report the insertion interval of the known reference signal inserted into the data, at the reception timing of the information signal for requesting the insertion interval of the known reference signal and the transmission request information of the data. Since the communication based on the insertion interval of this known reference signal is carried out, the throughput of the communication can be improved.

Moreover, the radio communication method of the present invention includes a step in the foregoing invention, where the receiving part radio communication apparatus refers to the information signal related to the information for requesting the insertion interval of the known reference signal and the transmission request information of the data received from the transmitting part radio communication apparatus, and determines the insertion interval of the known reference signal which is optimal in the data transmission.

Consequently, the receiving part radio communication apparatus refers to the information signal related to the information for requesting the insertion interval of the known reference signal and the transmission request information of the data immediately before the transmitting part radio communication apparatus transmits the data to the receiving part radio communication apparatus, and can determine the insertion interval of the known reference signal inserted into the data.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the transmitting part radio communication apparatus transmits a data different from the data, to the receiving part radio communication apparatus prior to transmitting the data; a step where the receiving part radio communication apparatus receives the different data and determines the insertion interval of the known reference signal; a step where the receiving part radio communication apparatus reports the insertion interval of the known reference signal together with a reception Ack information indicating that the reception of the different data has been complete, to the transmitting part radio communication apparatus; and a step where the transmitting part radio communication apparatus transmits the data, into which the known reference signal is inserted in accordance with the insertion interval of the known reference signal reported from the receiving part radio communication apparatus, to the receiving part radio communication apparatus.

Consequently, the transmitting part radio communication apparatus performs the request of the determination on the receiving part radio communication apparatus, for example, if the insertion interval of the optimal known reference signal cannot be determined, and the receiving part radio communication apparatus determines the insertion interval of the known reference signal inserted into the data, at the reception timing of any data, and can report this insertion interval together with the reception Ack information. Since the communication based on the insertion interval of this known reference signal is carried out, the throughput of the communication can be improved.

Moreover, the radio communication method of the present invention has a step in the foregoing invention, where the receiving part radio communication apparatus refers to an information signal related to the different data received from the transmitting part radio communication apparatus, and determines the insertion interval of the known reference signal which is optimal in transmitting the data to the receiving part radio communication apparatus.

Consequently, the transmitting part radio communication apparatus refers to the information signal related to the reception Ack information immediately before the transmitting part radio communication apparatus transmits the data to the receiving part radio communication apparatus, and can determine and report the insertion interval of the known reference signal inserted into the data.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data transmitted through a propagation path to the receiving part radio communication apparatus from the transmitting part radio communication apparatus is variable, including: a step where the receiving part radio communication apparatus receives an information signal transmitted to any radio communication apparatus from the transmitting part radio communication apparatus; a step where the receiving part radio communication apparatus refers to the received information signal and determines the insertion interval of the known reference signal; a step where the receiving part radio communication apparatus reports the insertion interval of the determined known reference signal to the transmitting part radio communication apparatus; and a step where the transmitting part radio communication apparatus inserts the known reference signal into the data, in accordance with the insertion interval of the known reference signal reported from the receiving part radio communication apparatus, and transmits to the receiving part radio communication apparatus.

Consequently, the receiving part radio communication apparatus refers to the information signal received before the transmitting part radio communication apparatus transmits the data to the receiving part radio communication apparatus, and can determine and report the insertion interval of the known reference signal inserted into the data. Since the communication based on the insertion interval of this known reference signal is carried out, the throughput of the communication can be improved.

Also, in order to attain the foregoing object, a radio communication method of the present invention is a radio communication method used in a radio communication system that is provided with a transmitting part radio communication apparatus and a receiving part radio communication apparatus, in which an insertion interval of a known reference signal inserted into a data that is propagated in a communication between the transmitting part radio communication apparatus and the receiving part radio communication apparatus is variable, including: a step where the transmitting part radio communication apparatus and the receiving part radio communication apparatus acquire the insertion interval of the known reference signal; a step where each of the transmitting part radio communication apparatus and the receiving part radio communication apparatus acquires the insertion interval of the known reference signal; and a step where the transmitting part radio communication apparatus or the receiving part radio communication apparatus uses the insertion interval of the known reference signal acquired by each of the transmitting part radio communication apparatus and the receiving part radio communication apparatus and determines the insertion interval of the known reference signal inserted into the data.

Consequently, both of the transmitting part radio communication apparatus and the receiving part radio communication apparatus can determine the insertion interval of the known reference signal. For example, any one of the two known reference signals or the average of the two known reference signals or the like can be calculated and selected, thereby determining the insertion interval of the known reference signal at the better precision.

Also, in order to attain the foregoing object, is a radio communication method used in a radio communication system that is provided with: a plurality of radio communication apparatuses; and a communication managing apparatus communicable with the plurality of radio communication apparatuses, in which an insertion interval of a known reference signal inserted into a data that is propagated in a communication between each of the plurality of radio communication apparatuses and the communication managing apparatus is variable, including: a step where the communication managing apparatus determines the insertion interval of the known reference signal which is optimal in the communication with each of the plurality of radio communication apparatuses; and a step of storing the insertion interval of the known reference signal which is optimal in a propagation path to each of the plurality of radio communication apparatuses.

Consequently, the communication managing apparatus can calculate the insertion interval of the known reference signal which is optimal for the communication with each of the plurality of radio communication apparatuses, and the communication managing apparatus can intensely manage and store.

Also, in order to attain the foregoing object, a radio communication method of the present invention is a radio communication method used in a radio communication system that is provided with: a plurality of radio communication apparatuses; and a communication managing apparatus communicable with the plurality of radio communication apparatuses, in which an insertion interval of a known reference signal inserted into a data that is propagated in a communication between each of the plurality of radio communication apparatuses and the communication managing apparatus is variable, including: a step where each of the plurality of radio communication apparatuses determines the insertion interval of the known reference signal which is optimal in the communication with the communication managing apparatus; and a step of storing the insertion interval of the known reference signal which is optimal in a propagation path to the communication managing apparatus.

Consequently, each of the plurality of radio communication apparatuses can calculate the insertion interval of the known reference signal that is optimal for the communication with the communication managing apparatus, which can be managed and stored by each radio communication apparatus.

Moreover, the radio communication method of the present invention has a step in the foregoing invention, where each of the plurality of radio communication apparatuses refers to a report signal which is reported to any of the radio communication apparatuses by the communication managing apparatus, and determines the insertion interval of the known reference signal which becomes optimal in the propagation path to the communication managing apparatus.

Consequently, for example, the report signal, such as a beacon or the like, which is periodically reported from the communication managing apparatus can be used to determine the insertion interval of the known reference signal.

Moreover, the radio communication method of the present invention has a step of referring to a temporal variation quantity of a propagation path response, in the insertion interval of the known reference signal, and calculating the insertion interval of the known reference signal which becomes optimal in transmitting the data, in the foregoing invention.

Consequently, by referring to the temporal variation quantity of the propagation path response, it is possible to calculate the insertion interval of the optimal known reference signal, and possible to determine the insertion interval of the pilot signal which becomes optimal in the data transmission.

BRIEF DESCRIPTION OF THE DRAWINGS

FIG. 1 is a block diagram showing one example of an inner configuration of a radio communication apparatus that is a configuration element of a radio communication system of the first embodiment of the present invention, FIG. 3 is a sequence chart showing a process and propagation data in the radio communication system of the first embodiment of the present invention.

BEST MODE FOR CARRYING OUT THE INVENTION

Figure 2A:
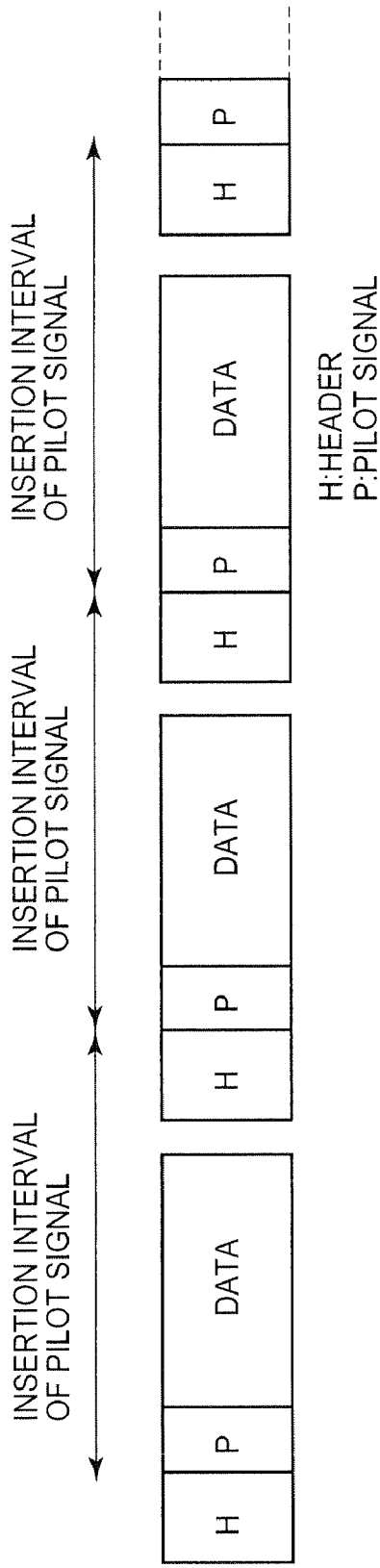
FIG. 2A is a diagrammatic view showing a format of a propagation data when the propagation data is made (divided) into packets at a predetermined capacity, in the radio communication system of the first embodiment of the present invention.

The first to fourth embodiments of the present invention will be described below with reference to the drawings.

First Embodiment

At first, the first embodiment of the present invention is explained. FIG. 1 is a block diagram showing one example of an inner configuration of a radio communication apparatus that is a configuration element of a radio communication system of the first embodiment of the present invention. A radio communication apparatus 100 shown in FIG. 1 is provided with a receiving RF unit 1, a demodulating unit 2, a pilot signal insertion interval acquiring unit 3, a transmitting unit 4 and a transmitting RF unit 5.

The receiving RF unit 1 converts a radio signal received from a propagation path by an antenna 9 into a signal that can be processed in a physical layer, and sends the signal after the conversion to the demodulating unit 2 and the pilot signal insertion interval acquiring unit 3. The demodulating unit 2 carries out a demodulating process of the signal sent from the receiving RF unit 1, and outputs the signal after the demodulation as a reception data to a higher layer.

On the other hand, the pilot signal insertion interval acquiring unit 3 can acquire (determine) the insertion interval of the pilot signal, since it calculates the insertion interval of the optimal pilot signal (known reference signal, also referred to as a pilot symbol) and the insertion interval of the pilot signal is sent from the higher layer. Incidentally, for the pilot signal insertion interval acquiring unit 3, for example, a function for using a GPS signal and the like, detecting a movement speed of the radio communication apparatus 100 and calculating the insertion interval of the pilot signal optimal for the movement speed, and a function for using the signal sent from the receiving RF unit 1, detecting a temporal variation quantity in a propagation path response and calculating the insertion interval of the optimal pilot signal in accordance with the detection result are installed, which enables the pilot signal insertion interval acquiring unit 3 to acquire the insertion interval of the pilot signal, and also enables the acquisition of the insertion interval of the pilot signal calculated or acquired in a higher application.

In this way, the information related to the insertion interval of the pilot signal acquired by the pilot signal insertion interval acquiring unit 3 is sent as the information indicating the insertion interval of the pilot signal, or a transmission data to the transmitting unit 4. When the pilot signal insertion interval acquiring unit 3 sends the information related to the insertion interval of the pilot signal, as the information indicating the insertion interval of the pilot signal, to the transmitting unit 4, the transmitting unit 4 carries out the process for inserting the pilot signal into the transmission data in accordance with the insertion interval of the pilot signal, and the other transmitting processes.

On the other hand, when the pilot signal insertion interval acquiring unit 3 sends the information related to the insertion interval of the pilot signal as the transmission data to the transmitting unit 4, the transmitting unit 4 treats the information related to the insertion interval of the pilot signal as the transmission data. Incidentally, the transmitting unit 4 can use the information related to the insertion interval of the pilot signal acquired by the pilot signal insertion interval acquiring unit 3, as at least one of the transmission data and the information indicating the insertion interval of the pilot signal, or as both of them. The transmitting RF unit 5 converts the data, which is processed and outputted by the transmitting unit 4, into the radio signal, and transmits from the antenna 9 towards the propagation path.

With the above-mentioned configuration, the radio communication apparatus 100 shown in FIG. 1 can acquire the insertion interval of the pilot signal, insert the pilot signal into the transmission data in accordance with the acquired insertion interval of the pilot signal, transmits the acquired insertion interval of the pilot signal as the transmission data, and report the insertion interval of the pilot signal to a receiving part radio communication apparatus for receiving the transmission data. Incidentally, the insertion interval of the pilot signal can be represented as a time or data quantity.

Figure 2B:
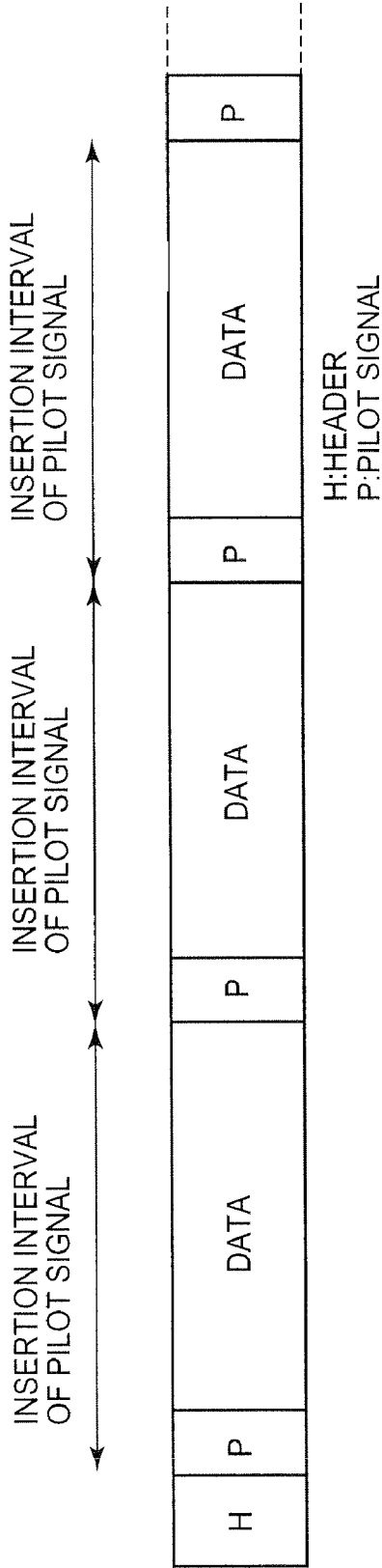
FIG. 2B is a diagrammatic view showing a format of a propagation data which is transmitted as a series of data without being made into the packets, in the radio communication system of the first embodiment of the present invention.

Also, FIG. 2A and FIG. 2B are diagrammatic views showing the format of the propagation data in the radio communication system of the first embodiment of the present invention. By the way, FIG. 2A is the diagrammatic view showing the format of the propagation data when the propagation data is made (divided) into packets at a predetermined capacity, and FIG. 2B is the diagrammatic view showing the format of the propagation data which is transmitted as a series of data without being made into the packets.

When the insertion of the pilot signal is carried out in accordance with the insertion interval of the pilot signal acquired by the pilot signal insertion interval acquiring unit 3, the propagation data transmitted to the propagation path from the radio communication apparatus 100 becomes in the state where the pilot signals are arranged at the predetermined interval (the insertion interval of the pilot), as shown in FIG. 2A and FIG. 2B. By the way, when the information related to the insertion interval of the pilot signal acquired by the pilot signal insertion interval acquiring unit 3 is used only as the transmission data, the insertion interval of the pilot signal becomes arbitrary (an insertion interval defined by a different method), and the information related to the insertion interval of the pilot signal is inserted into a portion (payload portion) noted as [Data] in FIG. 2A and FIG. 2B.

Also, FIG. 3 is a sequence chart showing the process and propagation data in the radio communication system of the first embodiment of the present invention. This FIG. 3 is the sequence chart of the radio communication system having two radio communication apparatuses, and shows the process in each of the two radio communication apparatuses and the propagation data propagated between the two radio communication apparatuses. Incidentally, FIG. 3 shows the temporal elapse from the upper portion to the lower portion.

FIG. 3 shows the flow of the process for determining the insertion interval of the pilot signal, when one radio communication apparatus (transmitting part: SRC (Source) 101 shown in FIG. 3) propagates the data to the other radio communication apparatus (receiving part: DEST (Designation) 102 shown in FIG. 3). The SRC 101 has the inner configuration of the radio communication apparatus 100 shown in FIG. 1.

At first, the SRC 101 transmits the information ([Acquirable] shown in FIG. 3) indicating that the insertion interval of the pilot signal can be acquired, together with a transmission request information ([Transmission Request] shown in FIG. 3) for requesting the transmission of the data (Transmission: Step S111). The DEST 102 receives the [Transmission Request] and [Acquirable] information (Reception: Step S112) and transmits a reception preparation completion information ([Preparation Completion] shown in FIG. 3) indicating that the reception preparation for the data is already completed, as the response to the transmission request information (Transmission: Step S113).

The SRC 101 receives the reception preparation completion information (Reception: Step S114) and calculates the insertion interval of the optimal pilot signal from the received reception preparation completion information or uses the other method, and consequently acquires the insertion interval of the pilot signal (Insertion Interval Acquisition: Step S115), and in accordance with the insertion interval of the pilot signal, inserts the pilot signal into the transmission data and transmits (Data Transmission: Step S116). Incidentally, in the data transmitted at the step S116, the insertion interval of the pilot signal is defined as shown in FIG. 2A or FIG. 2B.

In this way, between the two radio communication apparatuses (the SRC 101 and the DEST 102) configuring the radio communication system, the agreement that the SRC 101 determines the insertion interval of the pilot signal is concluded, and the data communication in the format shown in FIG. 2A or FIG. 2B can be carried out in accordance with the insertion interval of the pilot signal defined by the SRC 101.

Also, in the data communication after this, the pilot signal can be inserted at the insertion interval of the pilot signal firstly defined by the SRC 101. However, for example, by considering the fact that the SRC 101 and the DEST 102 move and the insertion interval of the optimal pilot signal is changed occasionally and momentarily, the SRC 101 is preferred to change the insertion interval of the pilot signal for each number of predetermined data transmissions (for example, for each data transmission).

Figure 4:
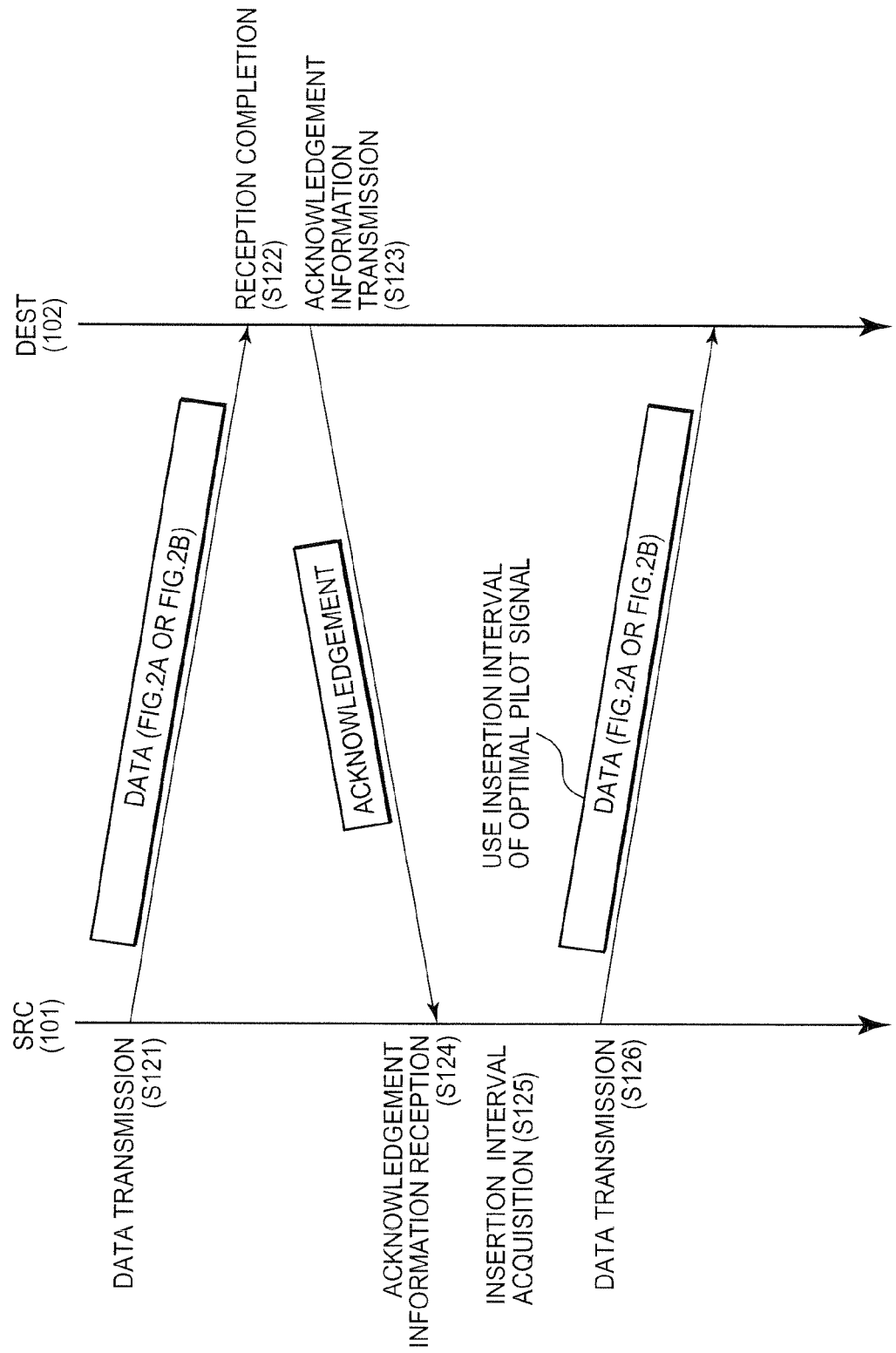
FIG. 4 is a sequence chart showing a propagation data and a process for making an insertion interval of a pilot signal variable, in each data transmission in the radio communication system of the first embodiment of the present invention.

Also, FIG. 4 is a sequence chart showing the propagation data and the process for making the insertion interval of the pilot signal variable, in each data transmission in the radio communication system of the first embodiment of the present invention. When the SRC 101 carries out the data transmission (Data Transmission: Step S121) and the DEST 102 completes the reception of the transmission data from this SRC 101 (Reception Completion: Step S122), the DEST 102 transmits the reception Ack information ([Ack] shown in FIG. 3) indicating that the reception has been successfully completed (Ack Information Transmission: Step S123).

The SRC 101 receives the reception Ack information from the DEST 102 (Ack Information Reception: Step S124) and calculates the insertion interval of the optimal pilot signal from the received reception Ack information or uses the other method and consequently acquires the insertion interval of the pilot signal (Insertion Interval Acquisition: Step S125), and in accordance with the insertion interval of the pilot signal, inserts the pilot signal into the transmission data to be transmitted in succession, and transmits (Data Transmission: Step S126).

In this way, for each data transmission (namely, at a timing when the data transmission is carried out following the reception of the reception Ack information), the SRC 101 always acquires the insertion interval of the optimal pilot signal and can carry out the data transmission by using the insertion interval of the pilot signal.

In the embodiments shown in FIG. 3 and FIG. 4 as mentioned above, the SRC 101 receives the information (the reception preparation Ack information shown in FIG. 3 and the reception Ack information shown in FIG. 4) transmitted to the SRC 101 from the DEST 102, and the acquisition of the insertion interval of the pilot signal (the acquisition through the calculation of the insertion interval of the pilot signal or the other method) is carried out at that reception timing.

However, in particular, when the SRC 101 uses the received reception preparation Ack information and reception Ack information and calculates the insertion interval of the pilot signal, there may be a possibility that the insertion interval of the pilot signal cannot be calculated at a high precision by using the small packet such as the reception preparation Ack information and reception Ack information. Also, when the SRC 101 receives the request of the insertion interval of the pilot signal and then calculates the insertion interval of the optimal pilot signal, there may be a possibility that the time until the response to the DEST 102 becomes long. So, for example, it can be designed such that when the SRC 101 receives an arbitrary signal transmitted from the DEST 102, the insertion interval of the pilot signal is calculated in accordance with this received arbitrary signal.

Figure 5:
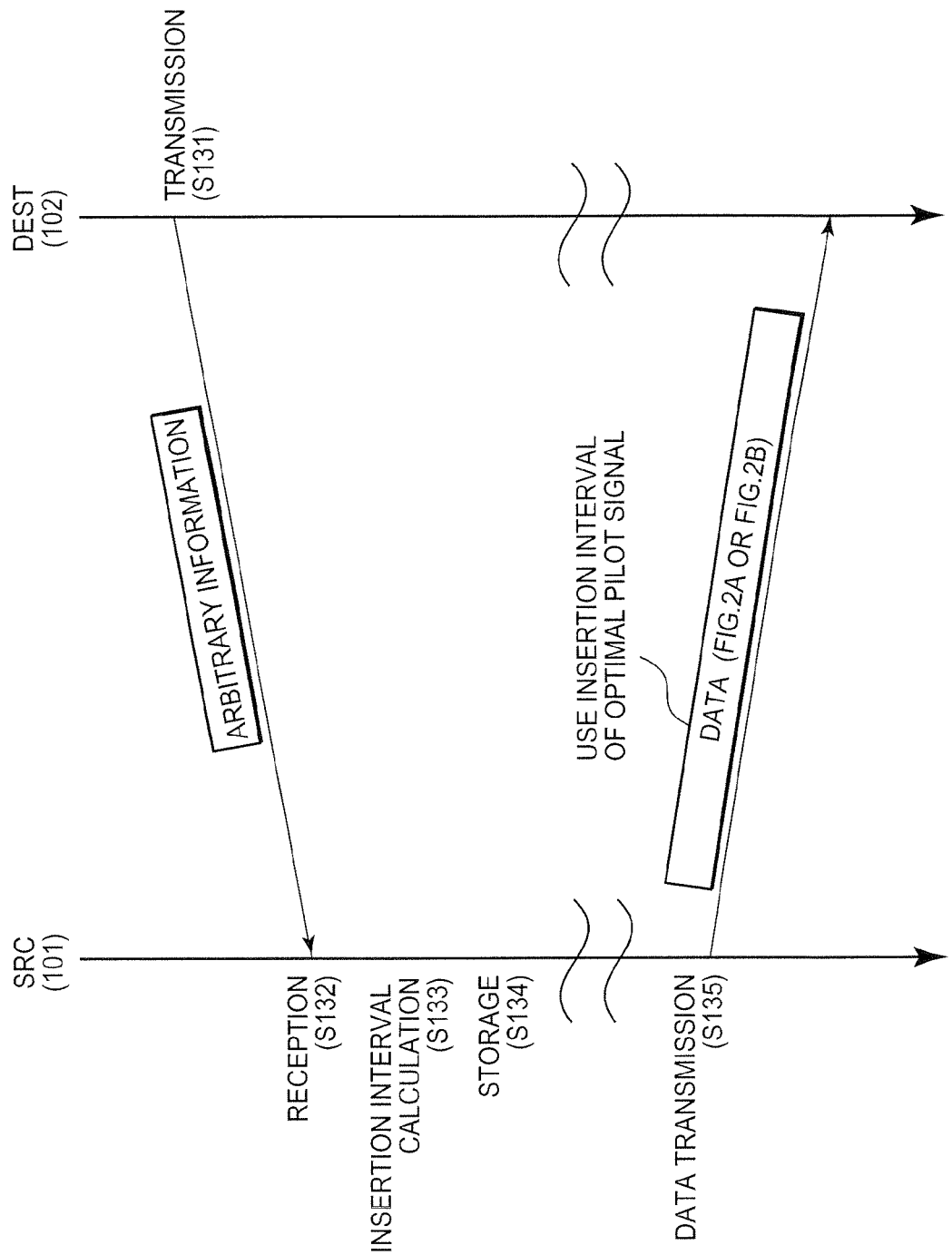
FIG. 5 is a sequence chart showing a propagation data and a process for making the insertion interval of the pilot signal variable in accordance with any signal, in the radio communication system of the first embodiment of the present invention.

FIG. 5 is a sequence chart showing a propagation data and a process for making the insertion interval of the pilot signal variable in accordance with any signal, in the radio communication system of the first embodiment of the present invention. For example, there may be a case that the DEST 102 transmits the data to a radio communication apparatus except the SRC 101 (Transmission: Step S131) and the SRC 101 can receive this data (signal) (Reception: Step S132).

Originally, the data transmitted from the DEST 102 at this step S131 has no meaning for the SRC 101. However, here, by using this data (signal), the SRC 101 grasps the propagation path situation between the SRC 101 and the DEST 102 and calculates the insertion interval of the optimal pilot signal (Insertion Interval Calculation: Step S133). Then, the SRC 101 stores the insertion interval of the optimal pilot signal acquired by the calculation in predetermined storing means (Storage: Step S134).

The insertion interval of the pilot signal calculated and stored as mentioned above is used when the SRC 101 transmits the data to the DEST 102 in future. That is, the SRC 101 inserts the pilot signal into the transmission data to be transmitted to the DEST 102, in accordance with the insertion interval of the pilot signal that is calculated at the step S133 and stored at the step S134, and transmits (Data Transmission: Step S135). By the way, in particular, in a case that at least one of the SRC 101 and the DEST 102 is moving or in the other case, the propagation path situation between the SRC 101 and the DEST 102 is changed occasionally and momentarily. Thus, the SRC 101 is preferred to be always able to update the calculation of the insertion interval of the optimal pilot signal.

In this way, since the SRC 101 grasps in advance the propagation path situation between the SRC 101 and the DEST 102 and calculates and stores the insertion interval of the optimal pilot signal to be used when the data is transmitted to the DEST 102, the SRC 101 can grasp the insertion interval of the optimal pilot signal without imposing the time and process load, at the time of the time and process data transmission, use this insertion interval of the pilot signal and perform the data transmission on the DEST 102.

Second Embodiment

Figure 6:
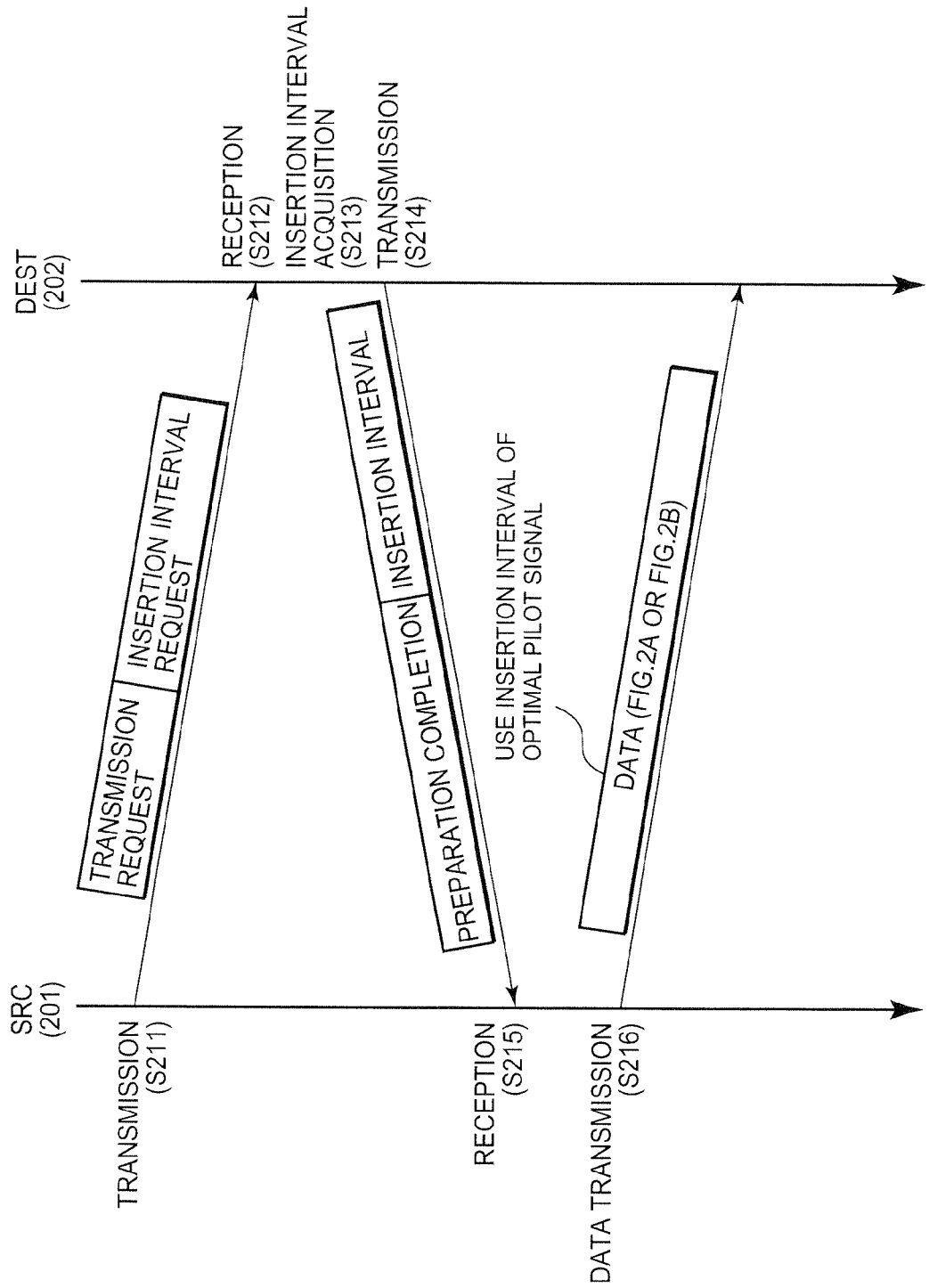
FIG. 6 is a sequence chart showing a process and a propagation data, in a radio communication system of the second embodiment of the present invention.

The second embodiment of the present invention will be described below. FIG. 6 is a sequence chart showing a process and a propagation data, in the radio communication system of the second embodiment of the present invention. This FIG. 6 is the sequence chart of the radio communication system having two radio communication apparatuses, and shows the process in each of the two radio communication apparatuses and the propagation data propagated between the two radio communication apparatuses. Incidentally, FIG. 6 shows the temporal elapse from the upper portion to the lower portion.

FIG. 6 shows the flow of the process for determining the insertion interval of the pilot signal, when one radio communication apparatus (transmitting part: SRC 201 shown in FIG. 6) propagates the data to the other radio communication apparatus (receiving part: DEST 202 shown in FIG. 6). The DEST 202 has the inner configuration of the radio communication apparatus 100 shown in FIG. 1.

At first, the SRC 201 transmits the information ([Insertion Interval Request] shown in FIG. 6) indicating the request of the insertion interval of the pilot signal together with the transmission request information ([Transmission Request] shown in FIG. 6) for requesting the transmission of the data (Transmission: Step S211). By the way, for example, the information indicating the [Acquirable] explained in the first embodiment and the information indicating the [Insertion Interval Request] in this second embodiment can be simply represented in the data field of the same 1 bit, and for example, in the case of indicating the [Acquirable], it can be represented as "1", and in the case of indicating the [Insertion Interval Request], it can be represented as "0".

The DEST 202 receives the [Transmission Request] and [Insertion Interval Request] information (Reception: Step S212) and calculates the insertion interval of the optimal pilot signal from the received transmission request information or uses the other methods and consequently acquires the insertion interval of the pilot signal (Insertion Interval Acquisition of Pilot Signal: Step 213). Then, the DEST 202 transmits the information ([Insertion Interval] shown in FIG. 6) related to the insertion interval of the pilot signal as the transmission data, together with the reception preparation completion information ([Preparation Completion] shown in FIG. 6) indicating that the reception preparation for the data is already completed, as the response to the transmission request information and, to the SRC 201 (Transmission: Step S214).

The SRC 201 receives the information with regard to the insertion interval of the pilot signal and the reception preparation completion information (Reception: Step S215), and inserts the pilot signal into the transmission data in accordance with the insertion interval of the pilot signal received from the DEST 202 and transmits (Data Transmission: Step S216). Incidentally, in the data transmitted at the step S216, the insertion interval of the pilot signal is defined as shown in FIG. 2A or FIG. 2B.

In this way, between the two radio communication apparatuses (the SRC 201 and the DEST 202) configuring the radio communication system, the agreement that the DEST 202 determines the insertion interval of the pilot signal is concluded, and the data communication in the format shown in FIG. 2A or FIG. 2B can be carried out in accordance with the insertion interval of the pilot signal defined by the DEST 202.

Also, in the data communication after this, the pilot signal can be inserted at the insertion interval of the pilot signal firstly defined by the DEST 202. However, for example, by considering the fact that the SRC 201 and the DEST 202 move and the insertion interval of the optimal pilot signal is changed occasionally and momentarily, the DEST 202 is preferred to change the insertion interval of the pilot signal for each number of predetermined data transmissions (for example, for each data transmission).

Figure 7:
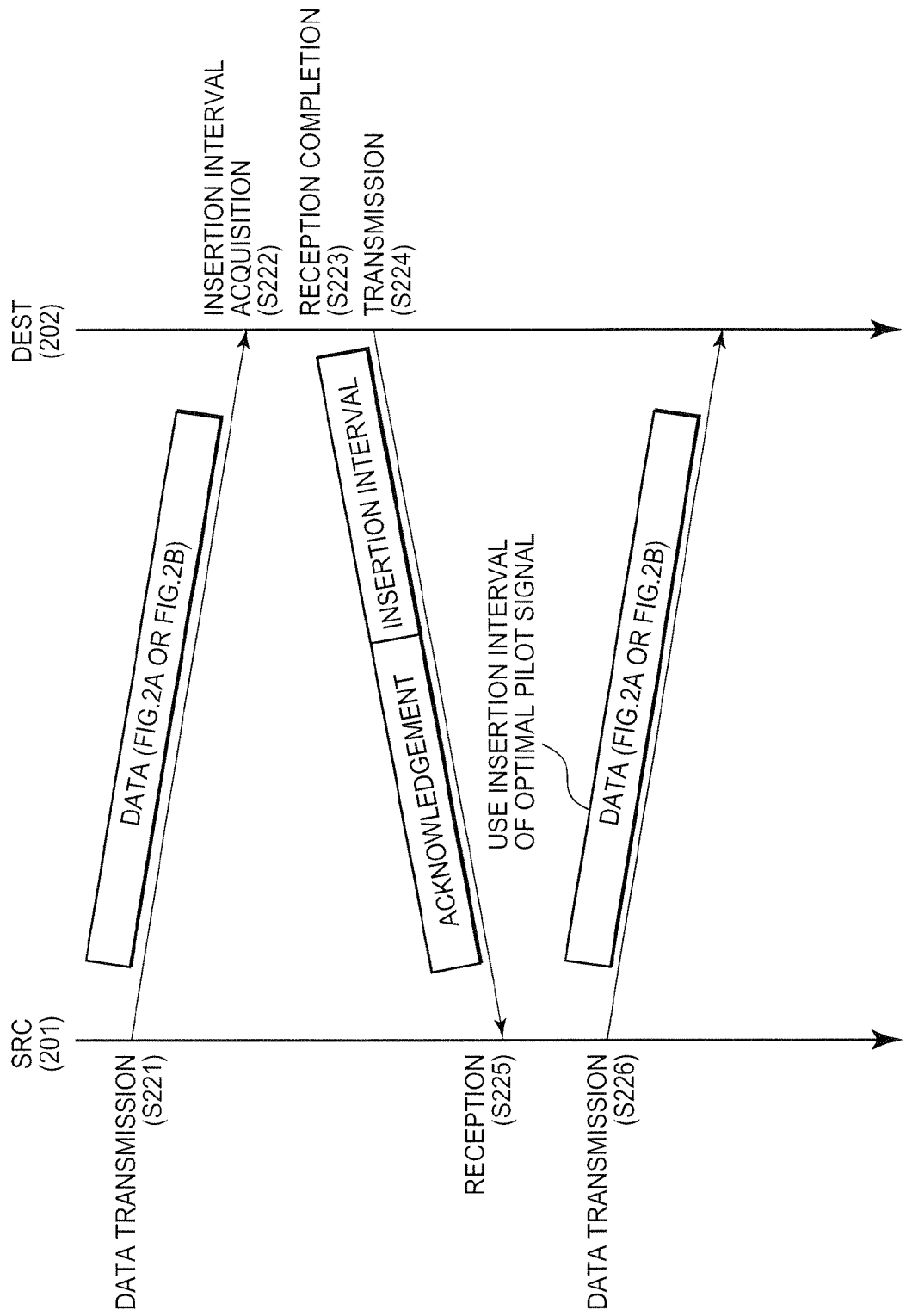
FIG. 7 is a sequence chart showing a propagation data and a process for making an insertion interval of a pilot signal variable, in each data transmission in the radio communication system of the second embodiment of the present invention.

FIG. 7 is a sequence chart showing the propagation data and the process for making the insertion interval of the pilot signal variable, in each data transmission in the radio communication system of the second embodiment of the present invention. When the SRC 201 carries out the data transmission (Data Transmission: Step S221), the DEST201 calculates the insertion interval of the optimal pilot signal from the data received from the SRC 201 or uses the other methods, and consequently acquires the insertion interval of the pilot signal (Insertion Interval Acquisition of Pilot Signal: Step S222).

Then, in the case of the completion of the reception of the transmission data from this SRC 201 (Reception Completion: Step S223), the DEST 202 transmits the information ([Insertion interval] shown in FIG. 7) related to the insertion interval of the pilot signal, together with the reception Ack information ([Ack] shown in FIG. 7) indicating that the reception has been successfully completed, as the transmission data, to the SRC 201 (Transmission: Step S224). Incidentally, in the foregoing explanation, the DEST 202 carries out the acquiring process for the insertion interval of the pilot signal is carried out during the reception of the data sent from the SRC 201. However, after the completion of the reception of the data from the SRC 201, the acquiring process for the insertion interval of the pilot signal can be also performed.

The SRC 201 receives the reception Ack information and the information related to the insertion interval of the pilot signal (Reception: Step S225), and in accordance with the insertion interval of the pilot signal received from the DEST 202, inserts the pilot signal into the transmission data and transmits (Data Transmission: Step S226).

In this way, for each data transmission (namely, at the timing when the data transmission is carried out following the reception of the reception Ack information), the SRC 201 can always receive the report of the insertion interval of the optimal pilot signal from the DEST 202 and carry out the data transmission by using the reported insertion interval of the pilot signal.

In the embodiments shown in FIG. 6 and FIG. 7 as mentioned above, the DEST 202 receives the information (the reception request information and insertion interval request information shown in FIG. 6 and the data shown in FIG. 7) transmitted to the DEST 202 from the SPC 201 and carries out the acquisition of the insertion interval of the pilot signal (the acquisition through the calculation of the insertion interval of the pilot signal or the other method) at that reception timing.

However, in particular, when the DEST 202 uses the received reception request information and insertion interval request information and calculates the insertion interval of the pilot signal, there may be a possibility that the insertion interval of the pilot signal cannot be calculated at the high precision by using the small packet such as the reception request information and insertion interval request information. Also, when the DEST 202 receives the request of the insertion interval of the pilot signal and then calculates the insertion interval of the optimal pilot signal, there may be a possibility that the time until the response to the SRC 201 becomes long. So, for example, it can be designed such that when the DEST 202 receives an arbitrary signal transmitted from the SRC 201, the insertion interval of the pilot signal is calculated in accordance with this received arbitrary signal.

Figure 8:
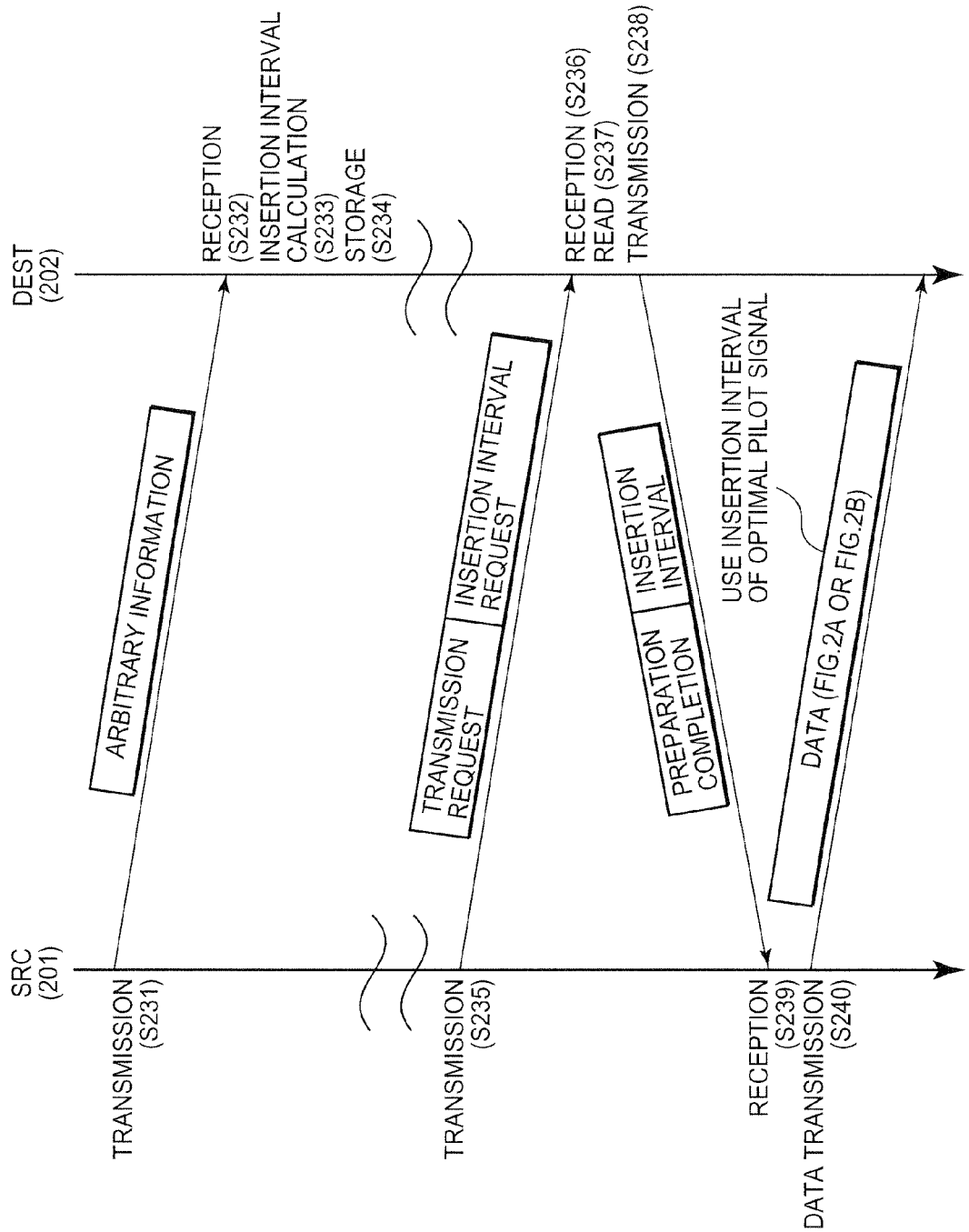
FIG. 8 is a sequence chart showing a propagation data and a process for making the insertion interval of the pilot signal variable in accordance with any signal, in the radio communication system of the second embodiment of the present invention.

FIG. 8 is a sequence chart showing a propagation data and a process for making the insertion interval of the pilot signal variable in accordance with any signal, in the radio communication system of the second embodiment of the present invention. For example, there may be a case that the SRC 201 transmits the data to a radio communication apparatus except the DEST 202 (Transmission: Step S231) and the DEST 202 can receive this data (signal) (Reception: Step S232).

Originally, the data transmitted from the SRC 201 at this step S231 has no meaning for the DEST 202. However, here, by using this data (signal), the DEST 202 grasps the propagation path situation between the SRC 201 and the DEST 202 and calculates the insertion interval of the optimal pilot signal (Insertion Interval Calculation: Step S233). Then, the DEST 202 stores the insertion interval of the optimal pilot signal acquired by the calculation in a predetermined storing device (Storage: Step S234).

The insertion interval of the pilot signal calculated and stored as mentioned above is used when the SRC 201 requests the insertion interval of the pilot signal to the DEST 202 in future and the DEST 202 reports the insertion interval of the pilot signal to the SRC 201.

That is, when the SRC 201 transmits the information ([Insertion Interval Request] shown in FIG. 8) indicating the request of the insertion interval of the pilot signal together with the transmission request information ([Transmission Request] shown in FIG. 8) requesting the transmission of the data to the DEST 202 (Transmission: Step S235), the DEST 202 receives the [Transmission Request] and [Insertion Interval Request] information (Reception: Step S236) and reads the insertion interval of the pilot signal stored at the step 234 (Read: Step S237) and transmits the information ([Insertion Interval] shown in FIG. 8) related to the insertion interval of the pilot signal, together with the reception preparation completion information ([Preparation Completion] shown in FIG. 8) indicating that the reception preparation for the data has been completed, as the response to the transmission request information, to the SRC 201 (Transmission: Step S238).

The SRC 201 receives the reception preparation completion information and the information related to the insertion interval of the pilot signal (Reception: Step S239), and in accordance with the insertion interval of the pilot signal received from the DEST 202, inserts the pilot signal into the transmission data and transmits (Data Transmission: Step S240). By the way, in particular, in a case that at least one of the SRC 201 and the DEST 202 is moving or in the other case, the propagation path situation between the SRC 201 and the DEST 202 is changed occasionally and momentarily. Thus, the DEST 202 is preferred to be always able to update the calculation of the insertion interval of the optimal pilot signal.

In this way, since the DEST 202 grasps in advance the propagation path situation between the SRC 201 and the DEST 202 and calculates and stores the insertion interval of the optimal pilot signal to be reported to the SRC 201, the DEST 202 can grasp the insertion interval of the optimal pilot signal without imposing the time and process load, at the time of the data transmission, and SRC 201 perform the data transmission on the DEST 202 by using this insertion interval of the pilot signal.

Third Embodiment

Figure 9:
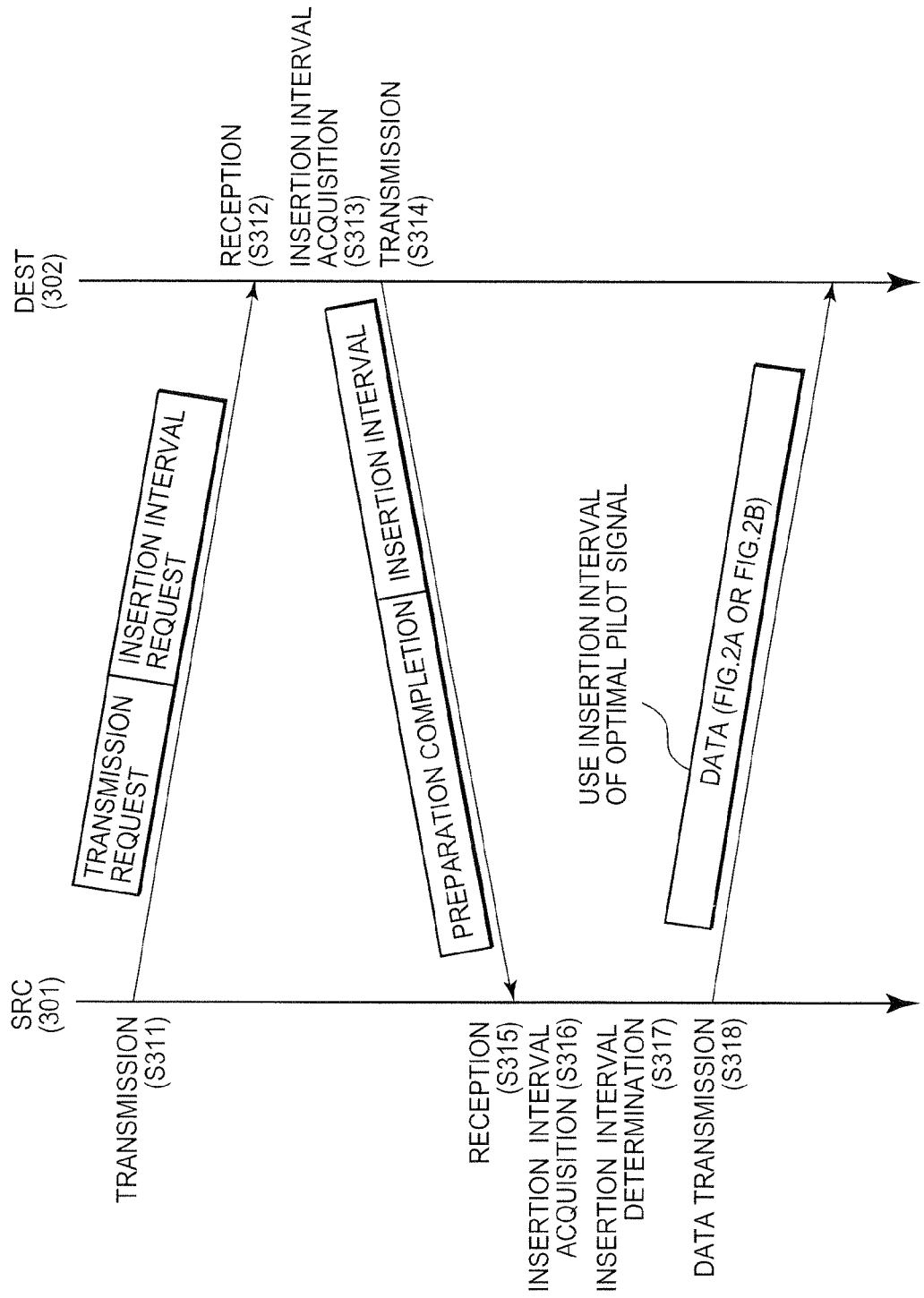
FIG. 9 is a sequence chart showing a process and a propagation data, in a radio communication system of the third embodiment of the present invention.

The third embodiment of the present invention will be described below. FIG. 9 is a sequence chart showing a process and a propagation data, in the radio communication system of the third embodiment of the present invention. This FIG. 9 is the sequence chart of the radio communication system having two radio communication apparatuses, and shows the process in each of the two radio communication apparatuses and the propagation data propagated between the two radio communication apparatuses. Incidentally, FIG. 9 shows the temporal elapse from the upper portion to the lower portion.

FIG. 9 shows the flow of the process for determining the insertion interval of the pilot signal, when one radio communication apparatus (transmitting part: SRC 301 shown in FIG. 9) propagates the data to the other radio communication apparatus (receiving part: DEST 302 shown in FIG. 9). Each of the SRC 301 and the DEST 302 has the inner configuration of the radio communication apparatus 100 shown in FIG. 1.

At first, the SRC 301 transmits the information ([Insertion Interval Request] shown in FIG. 9) indicating the request of the insertion interval of the pilot signal together with the transmission request information ([Transmission Request] shown in FIG. 9) for requesting the transmission of the data (Transmission: Step S311). The DEST 302 receives the [Transmission Request] and [Request] information (Reception: Step S312), and calculates the insertion interval of the optimal pilot signal from the received transmission request information, or uses the other method, and consequently acquires the insertion interval of the pilot signal (Insertion Interval Acquisition of Pilot Signal: Step S313). Then, the DEST 302 transmits the information ([Information Interval] shown in FIG. 9) related to the insertion interval of the pilot signal as the transmission data, together with the reception preparation completion information ([Preparation Completion shown in FIG. 9] for indicating that the reception preparation for the data has been completed, as the response to the transmission request information, to the SRC 301 (Transmission: Step S314). Those processes at the step S311 to the Step S314 are similar to the processes at the step S211 to the step S214.

The SRC 301 receives the reception preparation completion information and the information related to the insertion interval of the pilot signal (Reception: Step S315), and calculates the insertion interval of the optimal pilot signal from the received reception preparation completion information and the information related to the insertion interval of the pilot signal, or uses the other method, and consequently acquires the insertion interval of the pilot signal (Insertion Interval Acquisition of Pilot Signal: Step S316).

Then, it refers to both of the insertion interval of the pilot signal received at the step S315 (namely, the insertion interval of the pilot signal reported from the DEST 302) and the insertion interval of the pilot signal acquired by itself at the step S316, and determines the insertion interval of the pilot signal (Determination of Insertion interval of the pilot signal: Step S317), and in accordance with that pilot insertion interval, inserts the pilot signal into the transmission data and transmits (Data Transmission: Step S318). Incidentally, in the data transmitted at the step S318, the insertion interval of the pilot signal is defined as shown in FIG. 2A or FIG. 2B.

Also, in determining the insertion interval of the pilot signal at the step S317, it is possible to calculate the average of the insertion interval of the pilot signals acquired at the step S315 and step S316 and employ the longer insertion interval of the pilot signal of the insertion interval of the pilot signals acquired at the step S315 and step S316, and consequently use the acquisition results in both of the step SRC 301 and DEST 302 and determine the insertion interval of the pilot signal.

In this way, between the two radio communication apparatuses (the SRC 301 and the DEST 302) configuring the radio communication system, the agreement that the insertion interval of the pilot signal of the high precision is determined in accordance with the acquisition results of the insertion interval of the pilot signals in both of the SRC 301 and the DEST 302 is concluded, and the data communication in the format shown in FIG. 2A or FIG. 2B can be carried out in accordance with the insertion interval of the pilot signal defined as mentioned above.

Also, in the data communication after this, the pilot signal can be inserted at the insertion interval of the pilot signal firstly defined by using the acquisition results of both of the SRC 301 and the DEST 302. However, for example, by considering the fact that the SRC 301 or the DEST 302 moves and the insertion interval of the optimal pilot signal is changed occasionally and momentarily, the SRC 301 is preferred to change the insertion interval of the pilot signal for each number of predetermined data transmissions (for example, for each data transmission).

Figure 10:
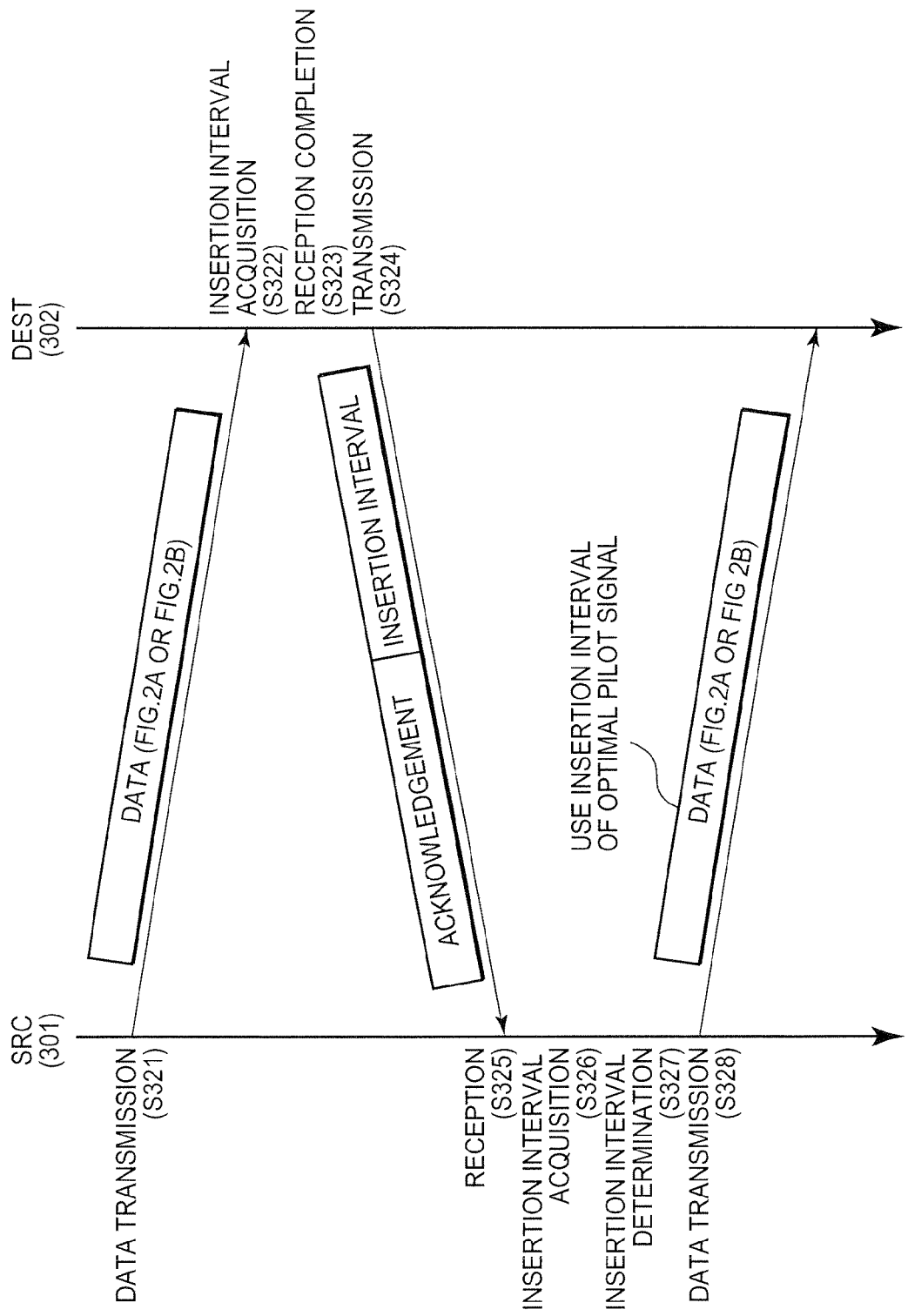
FIG. 10 is a sequence chart showing a propagation data and a process for making an insertion interval of a pilot signal variable, in each data transmission in the radio communication system of the third embodiment of the present invention.

FIG. 10 is a sequence chart showing the propagation data and the process for making the insertion interval of the pilot signal variable, in each data transmission in the radio communication system of the third embodiment of the present invention. When the SRC 301 carries out the data transmission (Data Transmission: Step S321), the DEST301 calculates the insertion interval of the optimal pilot signal from the data received from the SRC 301 or uses the other method, and consequently acquires the insertion interval of the pilot signal (Insertion Interval Acquisition of Pilot Signal: Step S322).

Then, in the case of the completion of the reception of the transmission data from this SRC 301 (Reception Completion: Step S323), the DEST 302 transmits the information ([Insertion interval] shown in FIG. 10) related to the insertion interval of the pilot signal, together with the reception Ack information ([Ack] shown in FIG. 10) indicating that the reception has been successfully completed, as the transmission data, to the SRC 301 (Transmission: Step S324). Incidentally, in the foregoing explanation, the DEST 302 carries out the acquiring process for the insertion interval of the pilot signal is carried out during the reception of the data sent from the SRC 301. However, after the completion of the reception of the data from the SRC 301, the acquiring process for the insertion interval of the pilot signal can be also performed.

The SRC 301 receives the reception Ack information and the information related to the insertion interval of the pilot signal (Reception: Step S325), and calculates the insertion interval of the optimal pilot signal from the received reception Ack information, or uses the other method, and consequently acquires the insertion interval of the pilot signal (Insertion Interval Acquisition: Step S326).

Then, it refers to both of the insertion interval of the pilot signal received at the step S325 (namely, the insertion interval of the pilot signal reported from the DEST 302) and the insertion interval of the pilot signal acquired by itself at the step S326, and determines the insertion interval of the pilot signal (Insertion interval Determination: Step S327), and in accordance with that pilot insertion interval, inserts the pilot signal into the transmission data and transmits (Data Transmission: Step S328).

In this way, for each data transmission (namely, at the timing when the data transmission is carried out following the reception of the reception Ack information), the SRC 301 uses the insertion interval of the pilot signal acquired by itself and the insertion interval of the pilot signal reported from the DEST 302, and determines the insertion interval of the pilot signal optimal for the communication, and can carry out the data transmission by using the insertion interval of the pilot signal determined as mentioned above.

Fourth Embodiment

Figure 11:
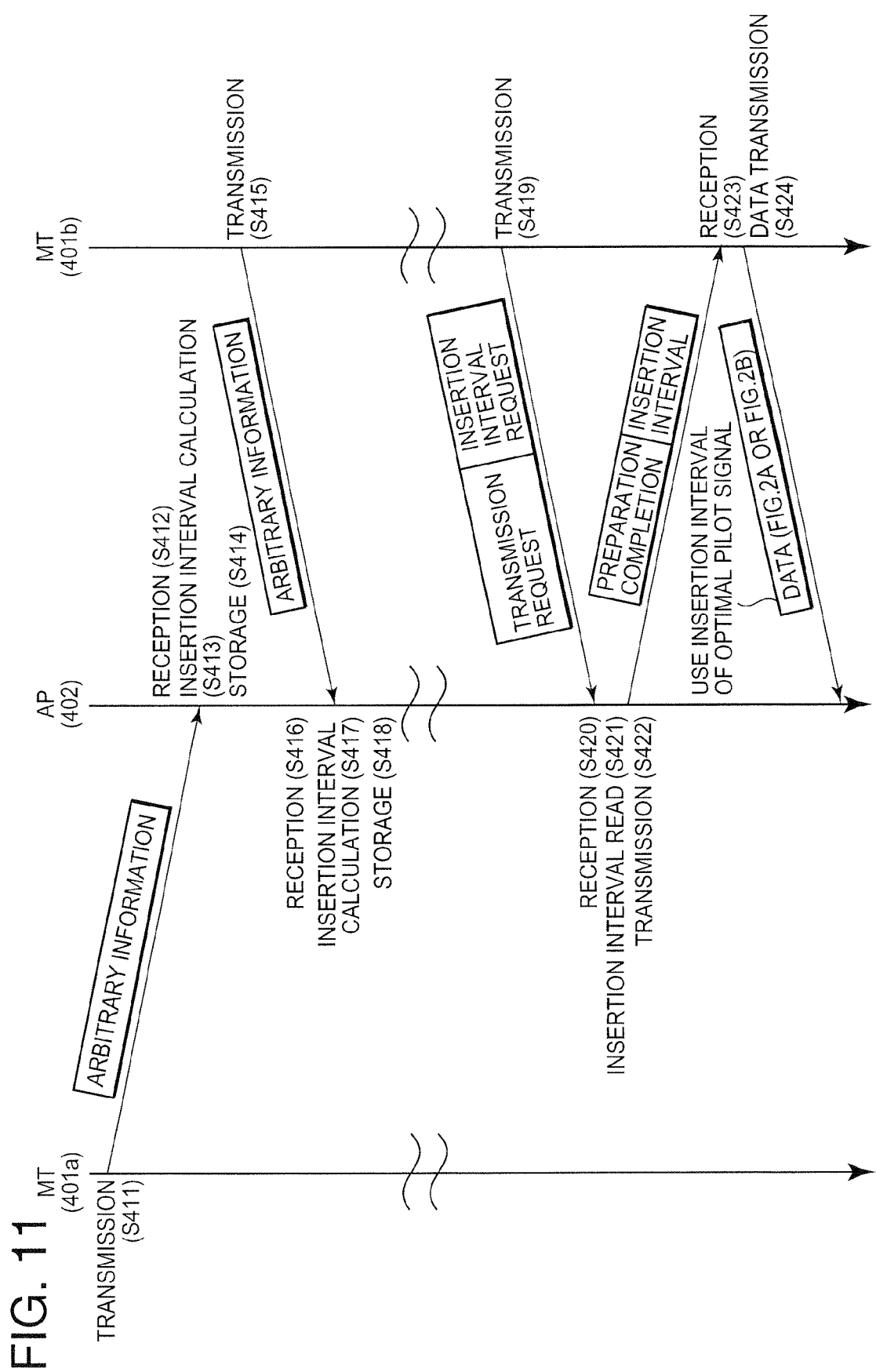
FIG. 11 is a sequence chart showing a propagation data and a process of an integration processing type, in a radio communication system of the fourth embodiment of the present invention.

The fourth embodiment will be described below. FIG. 11 is a sequence chart showing a propagation data and a process of an integration processing type, in a radio communication system of the fourth embodiment of the present invention. This FIG. 11 is the sequence chart of the radio communication system having a plurality of radio communication apparatuses (MT) 401 and an access point (AP) 402, and shows the process in each of the two radio communication apparatuses and the propagation data propagated between the two radio communication apparatuses. Incidentally, FIG. 11 shows the temporal elapse from the upper portion to the lower portion.

The AP402 is a radio communication apparatus for intensively managing the communications in the plurality of MT401 (FIG. 11 shows only two MT401a, 401b), and this AP402 has the inner configuration of the radio communication apparatus 100 shown in FIG. 1. At first, when the MT 401a transmits an arbitrary information to the AP402 (Transmission: Step S411), the AP402 receives this arbitrary information (Reception: Step S412), and calculates the insertion interval of the pilot signal (Insertion interval Calculation: Step S413) and stores that calculation result in a predetermined storing unit (Storage: Step S414).

Also, when the MT401b transmits the arbitrary information to the AP402 (Transmission: Step S415), similarly, the AP402 receives this arbitrary information (Reception: Step S416), calculates the insertion interval of the pilot signal (Insertion Interval Calculation: Step S417) and stores the calculation result in a predetermined storing unit (Storage: Step S418). Incidentally, the processes at the step S411 to the step S414 and the step S415 to the step S418 are equal to the step S131 to the step S134 shown in FIG. 5 respectively.

In this way, the AP 402 calculates and stores the insertion interval of the pilot signal related to the plurality of MT 401. At the time of the data transmission to each MT 401 from the AP 402, it is possible for AP 402 to use the insertion interval of the pilot signal optimal for each MT 401 and report the insertion interval of the optimal pilot signal to each MT 401, in response to the request each MT 401.

That is, for example, as shown in FIG. 11, when the MT 401b transmits the transmission request information ([Transmission Request] shown in FIG. 11) and the information ([Insertion Interval] shown in FIG. 11) for requesting the insertion interval to the AP 402 (Step S419), the AP402 receives the transmission request information and the information for requesting the insertion interval (Step S420), reads the insertion interval of the optimal pilot signal related to the MT 401b from the predetermined storing unit (Step S421) and reports the insertion interval ([Insertion Interval] shown in FIG. 11) of this pilot signal, together with the reception preparation completion information ([Preparation Completion] shown in FIG. 11) (Step S422). The MT401b receives the insertion interval of the pilot signal (Step S423) and in accordance with the insertion interval of this pilot signal, inserts the pilot signal into the transmission data and transmits (Transmission: Step S424).

Also, when the request of the insertion interval of the pilot signal is received from the MT 401a, MT 401b, whether or not the insertion interval of the pilot signal stored in the predetermined storing unit is the old information is judged, and as necessary, the re-acquisition of the insertion interval of the pilot signal can be carried out, thereby providing the newest information.

As mentioned above, in the radio communication system, the function for calculating the pilot signal is installed in one radio communication apparatus (AP 402), and this AP 402 calculates and stores the information related to the insertion interval of the pilot signal in the communication with a different radio communication apparatus. Consequently, the plurality of MT 401, which carry out the communications with the AP 402, can carry out the data transmissions by using the insertion interval of the optimal pilot signal.

Figure 12:
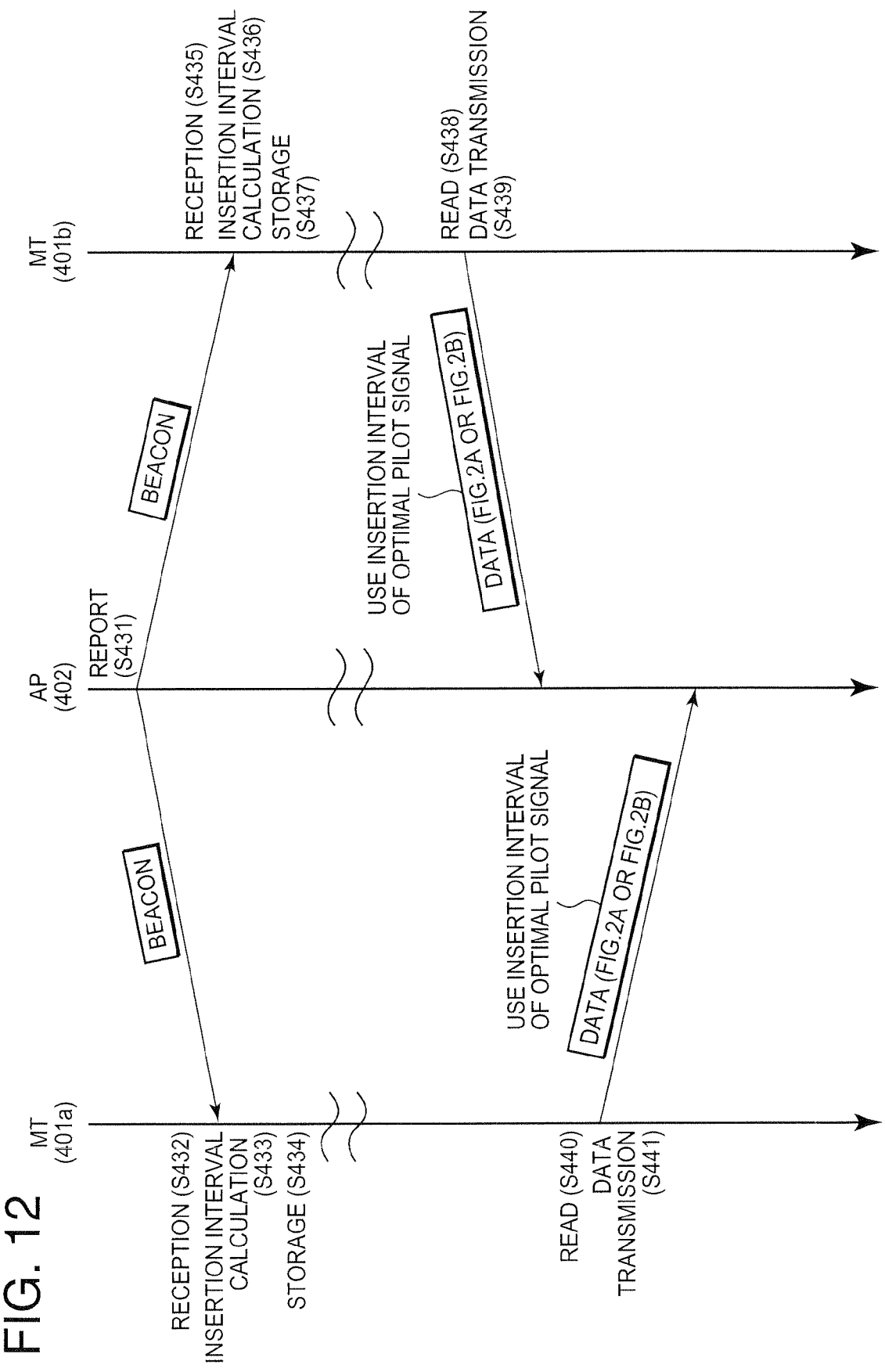
FIG. 12 is a sequence chart showing a propagation data and a process of a dispersion processing type, in the radio communication system of the fourth embodiment of the present invention.

Also, in the foregoing case, although the AP 402 calculates the insertion interval of the pilot signal, each MT 401 can calculate the insertion interval of the pilot signal. FIG. 12 is a sequence chart showing a propagation data and a process of a dispersion processing type, in the radio communication system of the fourth embodiment of the present invention. This FIG. 12 is the sequence chart of the radio communication system having the plurality of radio communication apparatuses (MT) 401 and the access point (AP) 402, similarly to FIG. 11, and shows the process in each of the two radio communication apparatuses and the propagation data propagated between the two radio communication apparatuses. Incidentally, FIG. 12 shows the temporal elapse from the upper portion to the lower portion. Also, the plurality of MT 401 (FIG. 12 shows only the two MT 401a, MT 401b) has the inner configuration of the radio communication apparatus 100 shown in FIG. 1.

The AP402 reports a beacon at a predetermined cycle (Report: Step S431). By the way, this beacon is the signal that includes the various information, such as a hardware address of a base station and a communication quality (a signal magnitude, a noise level, a signal quality and the like). All MT 401 (the MT 401 inside the communication cell of the AP 402) existing in a range communicable with the AP 402 can receive this beacon (Reception: Step S432 and Step S435). Then, each MT 401 imagines the propagation path situation from this beacon, calculates the insertion interval of the pilot signal (Insertion Interval Calculation: Step S433 and step S436) and stores that calculation result in a predetermined storing unit (Storage: Step S434 and Step S437).

In this way, each MT 401 calculates and stores the insertion interval of the optimal pilot signal in the communication with the AP 402 and can use the insertion interval of this optimal pilot signal, as the insertion interval of the pilot signal when communicating with the AP 402.

That is, for example, as shown in FIG. 12, when the MT 401a or MT 401b carries out the data transmission to the AP 402, the MT401a or MT401b reads the insertion interval of the optimal pilot signal from the predetermined storing unit (Read: Step S438 and Step S440), and in accordance with the insertion interval of this pilot signal, inserts the pilot signal into the transmission data and transmits (Data Transmission: Step S439 and Step S441). Also, the MT 401a or MT 401b is preferred to always calculate the insertion interval of the pilot signal, in accordance with the newest beacon and the received data from the AP402 and update the insertion interval of the pilot signal.

As mentioned above, in the radio communication system, the function for calculating the pilot signal is installed in the plurality of radio communication apparatuses (MT 401), and this MT 401 calculates and stores the information related to the insertion interval of the pilot signal in the communication with the AP 402. Consequently, the plurality of MT 401, which carry out the communications with the AP 402, can carry out the data transmissions by using the insertion interval of the optimal pilot signal. Also, in particular, the MT 401 guesses the propagation path situation, in accordance with the beacon periodically reported by the AP 402. Thus, it is possible to determine the insertion interval of the pilot signal. However, a signal other than the beacon is used to guess the propagation path situation. Or, newly, the AP 402 sends the signal for guessing the propagation path situation. Then, the MT 401 can guess the propagation path situation by using this signal.

INDUSTRIAL APPLICABILITY

As mentioned above, according to the present invention, the transmitting part radio communication apparatus determines the insertion interval of the known reference signal, and in accordance with the insertion interval of the determined known reference signal, inserts the known reference signal into the data and transmits to the receiving part radio communication apparatus. Thus, the transmitting part radio communication apparatus can determine the insertion interval of the known reference signal inserted when the data is transmitted to the receiving part radio communication apparatus from the transmitting part radio communication apparatus. Since the communication based on the insertion interval of this known reference signal is carried out, the throughput of the communication can be improved.

Also, according to the present invention, the receiving part radio communication apparatus determines the insertion interval of the known reference signal and reports the insertion interval of the determined known reference signal to the transmitting part radio communication apparatus. Thus, the receiving part radio communication apparatus can determine the insertion interval of the known reference signal inserted when the transmitting part radio communication apparatus transmits the data to the receiving part radio communication apparatus. Since the communication based on the insertion interval of this known reference signal is carried out, the throughput of the communication can be improved.

The invention claimed is:

1. A radio communication system that is provided with a transmitting part radio communication apparatus and a receiving part radio communication apparatus, in which an insertion interval of a known reference signal inserted into data that is propagated in a communication between said transmitting part radio communication apparatus and said receiving part radio communication apparatus is variable, wherein said receiving part radio communication apparatus has a known reference signal insertion interval acquiring section that acquires a first insertion interval of said known reference signal by using a received signal from said transmitting part radio communication apparatus, wherein said transmitting part radio communication apparatus has a known reference signal insertion interval receiving section that receives the first insertion interval of said known reference signal from said receiving part radio communication apparatus, and wherein said transmitting part radio communication apparatus has a known reference signal insertion interval acquiring section that acquires a second insertion interval of said known reference signal by using a received signal from said receiving part radio communication apparatus, and wherein said transmitting part radio communication apparatus has a known reference signal insertion interval determining section that determines a third insertion interval of said known reference signal to be inserted into said data by using the first and second insertion intervals of said known reference signal.

2. A radio communication method used in a radio communication system that is provided with a transmitting part radio communication apparatus and a receiving part radio communication apparatus, in which an insertion interval of a known reference signal inserted into data that is propagated in a communication between said transmitting part radio communication apparatus and said receiving part radio communication apparatus is variable, including:

a step where said receiving part radio communication apparatus acquires a first insertion interval of said known reference signal by using a received signal from said transmitting part radio communication apparatus, a step where said transmitting part radio communication apparatus receives the first insertion interval of said known reference signal from said receiving part radio communication apparatus, and a step where said transmitting part radio communication apparatus acquires a second insertion interval of said known reference signal by using a received signal from said receiving part radio communication apparatus, and a step where said transmitting part radio communication apparatus determines a third insertion interval of said known reference signal to be inserted into said data by using the first and second insertion intervals of said known reference signal.

3. A radio communication apparatus that sends or receives data in a radio communication system in which an insertion interval of a known reference signal inserted into said data that is propagated via a propagation path is variable, including:

a known reference signal insertion transmitting interval acquiring section that transmits a signal by which said receiving part radio communication apparatus acquires a first insertion interval of said known reference signal, a known reference signal insertion interval receiving section that receives the first insertion interval of said known reference signal from said receiving part radio communication apparatus, and a known reference signal insertion interval acquiring section that acquires a second insertion interval of said known reference signal by using a received signal from said receiving part radio communication apparatus, and a known reference signal insertion interval determining section that determines a third insertion interval of said known reference signal to be inserted into said data by using the first and second insertion intervals of said known reference signal.

* * * * *

UNITED STATES PATENT AND TRADEMARK OFFICE
CERTIFICATE OF CORRECTION

PATENT NO. : 7,545,770 B2  Page 1 of 1
APPLICATION NO. : 11/927338
DATED : June 9, 2009
INVENTOR(S) : Jun Hirano et al.

It is certified that error appears in the above-identified patent and that said Letters Patent is hereby corrected as shown below:

On the Title Page, Item (30), Foreign Application Priority Data, should read:

November 11, 2009 (JP)............................................ 2002-327118

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,545,770 B2  Page 1 of 1
APPLICATION NO. : 11/927338
DATED : June 9, 2009
INVENTOR(S) : Jun Hirano et al.

It is certified that error appears in the above-identified patent and that said Letters Patent is hereby corrected as shown below:

On the Title Page, Item (30), Foreign Application Priority Data, should read:

November 11, 2002    (JP)....................................... 2002-327118

This certificate supersedes the Certificate of Correction issued December 22, 2009.

Signed and Sealed this
Sixth Day of December, 2011

David J. Kappos
*Director of the United States Patent and Trademark Office*